(12) United States Patent
Wei et al.

(10) Patent No.: US 10,542,053 B2
(45) Date of Patent: Jan. 21, 2020

(54) ADDRESS MANAGEMENT APPARATUS, SYSTEM, AND METHOD FOR COMMUNICATION OVER MULTIPATH TRANSMISSION CONTROL PROTOCOL

(71) Applicant: Huawei Technologies Co., Ltd., Shenzhen (CN)

(72) Inventors: Xinpeng Wei, Beijing (CN); Chunshan Xiong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 15/473,159

(22) Filed: Mar. 29, 2017

(65) Prior Publication Data
US 2017/0208104 A1    Jul. 20, 2017

Related U.S. Application Data

(63) Continuation of application No. PCT/CN2014/088065, filed on Sep. 30, 2014.

(51) Int. Cl.
*G06F 15/16* (2006.01)
*H04L 29/06* (2006.01)
(Continued)

(52) U.S. Cl.
CPC .......... *H04L 65/1069* (2013.01); *H04L 45/24* (2013.01); *H04L 61/2007* (2013.01)

(58) Field of Classification Search
CPC . H04L 65/1069; H04L 67/2871; H04L 69/18; H04L 67/28; H04L 61/2007; H04L 45/24; H04L 69/169; H04L 29/06
(Continued)

(56) References Cited

U.S. PATENT DOCUMENTS 8,400,923 B2 * 3/2013 Kini ................. H04L 45/24
370/235
8,868,733 B2 * 10/2014 Livet ................. H04W 60/005
709/224
(Continued)

FOREIGN PATENT DOCUMENTS

CN        103155518 A     6/2013
JP        2014511624 A    5/2014
(Continued)

OTHER PUBLICATIONS

X. Wei et al., "MPTCP Proxy Mechanisms" Internet-Draft, Huawei Technologies, Jun. 30, 2014, 12 pages.

*Primary Examiner* — Krisna Lim
(74) *Attorney, Agent, or Firm* — Slater Matsil, LLP

(57) ABSTRACT

Embodiments of the present invention provide an address management apparatus, system, and method for communication over the Multipath Transmission Control Protocol (MTCP). A processing module allocates a corresponding internet protocol (IP) address to each MPTCP session, where the MPTCP session is an MPTCP session between a first host and a second host, the first host is the host supporting MPTCP, and the second host is the host not supporting MPTCP, and when the MPTCP session is terminated, the processing module releases the corresponding IP address allocated to the MPTCP session. A transceiver module sets up the MPTCP session according to the IP address.

20 Claims, 12 Drawing Sheets

(51) Int. Cl.
*H04L 12/707* (2013.01)
*H04L 29/12* (2006.01)

(58) Field of Classification Search
USPC .......................................................... 709/227
See application file for complete search history.

(56) References Cited

U.S. PATENT DOCUMENTS

| | | | |
|---|---|---|---|
| 9,455,897 B2 * | 9/2016 | Krishnaswanny | ...... H04L 45/00 |
| 2012/0144062 A1 | 6/2012 | Livet et al. | |
| 2013/0318239 A1 | 11/2013 | Scharf et al. | |
| 2014/0351447 A1 * | 11/2014 | Annamalaisami | ........................... |
| | | | H04L 65/1069 |
| | | | 709/227 |
| 2015/0282219 A1 * | 10/2015 | Kweon | ................. H04W 76/12 |
| | | | 370/235 |
| 2015/0319270 A1 * | 11/2015 | Roeland | .............. H04L 61/2007 |
| | | | 370/254 |
| 2017/0118787 A1 * | 4/2017 | Kekki | ................. H04W 76/025 |
| 2018/0062979 A1 * | 3/2018 | Zee | ....................... H04W 80/06 |
| 2018/0123948 A1 * | 5/2018 | Lin | ........................ H04L 45/02 |

FOREIGN PATENT DOCUMENTS

| | | |
|---|---|---|
| WO | 2010149832 A1 | 12/2010 |
| WO | 2012051493 A1 | 4/2012 |
| WO | 2014068062 A1 | 5/2014 |

* cited by examiner

US 10,542,053 B2

ADDRESS MANAGEMENT APPARATUS, SYSTEM, AND METHOD FOR COMMUNICATION OVER MULTIPATH TRANSMISSION CONTROL PROTOCOL

CROSS-REFERENCE TO RELATED APPLICATIONS

This application is a continuation of International Application No. PCT/CN2014/088065, filed on Sep. 30, 2014, the disclosure of which is hereby incorporated by reference in its entirety.

TECHNICAL FIELD

Embodiments of the present invention relate to communications technologies, and in particular, to an address management apparatus, system, and method for communication over the Multipath Transmission Control Protocol.

BACKGROUND

A core idea of the Multipath Transmission Control Protocol (MPTCP) is to add, between an application layer and a transmission layer, an MPTCP layer supporting multipath transmission. Conventional transmission control protocol (TCP) data is split into multiple TCP subflows, and different TCP subflows are transmitted along different paths and aggregated on a peer host. Although an MPTCP technology allows a terminal to simultaneously use multiple interfaces to perform communication, MPTCP requires that two parties participating in communication should both support MPTCP. When a communication party does not support MPTCP, MPTCP cannot be used to perform communication. Communication over MPTCP requires that two communication parties should both support the MPTCP protocol. In order that a host having an MPTCP capability can communicate with a host not having an MPTCP capability, a concept of an MPTCP proxy is further put forward. A final objective of the MPTCP proxy is to implement mapping between an MPTCP session and a TCP session, between a host supporting MPTCP and a host not supporting MPTCP. After the MPTCP proxy receives an MPTCP connection setup request initiated by the host supporting MPTCP, the MPTCP proxy uses an IP address that is of the host supporting MPTCP and is carried in the connection request to set up a TCP connection to the host not supporting MPTCP. An MPTCP connection setup process is similar to a TCP connection setup process. A difference lies in that MPTCP defines a new TCP option (MP_CAPABLE), used to indicate that the connection setup process is to set up an MPTCP connection. If MPTCP is not supported, a communication peer end ignores the MP_CAPABLE, and returns an ordinary TCP handshake message. Therefore, the host supporting MPTCP may determine whether the communication peer end supports MPTCP, and set up the MPTCP connection if the communication peer end supports MPTCP, or set up an ordinary TCP connection if the communication peer end does not support MPTCP. A function of the MPTCP proxy is to return, in place of the host not supporting MPTCP, the MP_CAPABLE to the host supporting MPTCP, so that the host supporting MPTCP considers that the communication peer end is a host supporting MPTCP, and further that the MPTCP connection may be set up.

In a mechanism of the conventional MPTCP proxy, an internet protocol (IP) address of a first MPTCP subflow of the host supporting MPTCP is used to set up a TCP session. However, when the host supporting MPTCP stops using an interface corresponding to the IP address, it is possible that the IP address is released or occupied by another host. This affects communication of the TCP session that is set up between the MPTCP proxy and the host not supporting MPTCP.

SUMMARY

Embodiments of the present invention provide an address management apparatus, system, and method for communication over the Multipath Transmission Control Protocol (MTCP), so as to improve transmission performance of an MPTCP session.

A first aspect of the present invention provides an address management apparatus for communication over the Multipath Transmission Control Protocol, where the apparatus includes a processing module, configured to allocate a corresponding IP address to each MPTCP session, where the MPTCP session is an MPTCP session between a first host and a second host, the first host is the host supporting MPTCP, and the second host is the host not supporting MPTCP; and when the MPTCP session is terminated, further configured to release the corresponding IP address allocated to the MPTCP session. The apparatus also includes a transceiver module, configured to set up the MPTCP session according to the IP address.

With reference to the first aspect, in a first possible implementation manner, the transceiver module is configured to receive a first MPTCP subflow setup request message from the first host, where the first MPTCP subflow setup request message is used to instruct to set up an initial MPTCP subflow between the first host and the second host; and the processing module is configured to allocate the IP address to an MPTCP session to which the first MPTCP subflow setup request message belongs; and further configured to set up an MPTCP subsession with the first host according to the IP address, and set up a TCP session with the second host according to the IP address.

With reference to the first aspect or the first feasible implementation manner of the first aspect, in a second feasible implementation manner, the processing module is further configured to: after all MPTCP subflows included in the MPTCP session are terminated, release the IP address; or after the TCP session with the host not supporting MPTCP is terminated, release the IP address.

With reference to the first aspect, in a third feasible implementation manner, the transceiver module is further configured to receive a second MPTCP subflow setup request message from the first host, where the second MPTCP subflow setup request message is used to instruct to set up an initial MPTCP subflow between a first interface of the first host and the second host; and the processing module is further configured to determine whether another MPTCP session has been set up on the first interface of the first host, and if the another MPTCP session has been set up on the first interface of the first host, allocate the IP address, where the IP address is a first IP address corresponding to the another MPTCP session, or the IP address is a newly allocated second IP address; and further configured to set up an MPTCP subsession with the first host according to the first IP address, and set up a TCP session with the second host according to the first IP address; or set up an MPTCP subsession with the first host according to the second IP address, and set up a TCP session with the second host according to the second IP address.

With reference to the third feasible implementation manner of the first aspect, in a fourth feasible implementation manner, the processing module is further configured to: after all the MPTCP sessions corresponding to the first IP address are terminated, release the first IP address; or after all the MPTCP sessions corresponding to the second IP address are terminated, release the second IP address.

With reference to the first aspect, in a fifth feasible implementation manner, the transceiver module is further configured to receive a third MPTCP subflow setup request message sent through a second interface, where the third MPTCP subflow setup request message is used to instruct to set up an initial MPTCP subflow between the second interface and the second host; and the processing module is further configured to allocate the IP address to the second interface when the second interface belongs to the first host, where the IP address is a third IP address, and the third IP address is an IP address of another interface on which the first host has set up an MPTCP subsession, or the IP address allocated to the second interface is a newly allocated fourth IP address; specifically further configured to allocate the IP address to the second interface when the second interface does not belong to the first host and the second interface belongs to a third host, where the IP address is the newly allocated fourth IP address, and the third host is the host supporting MPTCP; and specifically further configured to set up an MPTCP subsession with the first host according to the third IP address, and set up a TCP session with the second host according to the third IP address; or set up an MPTCP subsession with the first host according to the fourth IP address, and set up a TCP session with the second host according to the fourth IP address; or set up an MPTCP subsession with the third host according to the fourth IP address, and set up a TCP session with the second host according to the fourth IP address.

With reference to the fifth feasible implementation manner of the first aspect, in a sixth feasible implementation manner, the processing module is further configured to: after all the MPTCP sessions corresponding to the third IP address are terminated, release the third IP address; or after all the MPTCP sessions corresponding to the fourth IP address are terminated, release the fourth IP address.

With reference to the first aspect, in a seventh feasible implementation manner, the transceiver module is further configured to receive a fourth MPTCP subflow setup request message from the first host, where the fourth MPTCP subflow setup request message is used to instruct to set up an initial MPTCP subflow between the first host and the second host, and the fourth MPTCP subflow setup request message includes an IP address of the first host; and further configured to send a reservation request to an IP management device, so that the IP management device does not release the IP address of the first host according to the reservation request before the MPTCP session is terminated; and the processing module is further configured to allocate the IP address of the first host to an MPTCP session to which the fourth MPTCP subflow setup request message belongs; and further configured to set up an MPTCP subsession with the first host according to the IP address of the first host, and set up a TCP session with the second host according to the IP address of the first host.

With reference to the seventh feasible implementation manner of the first aspect, in an eighth feasible implementation manner, the transceiver module is further configured to: after all MPTCP subflows included in the MPTCP session are terminated, send a cancel reservation request to the IP management device, so that after the IP management device receives the cancel reservation request, the IP management device allows releasing the IP address of the first host; or after the TCP session with the second host is terminated, send a cancel reservation request to the IP management device, so that after the IP management device receives the cancel reservation request, the IP management device allows releasing the IP address of the first host.

A second aspect of the present embodiments provides an address management apparatus for communication over the Multipath Transmission Control Protocol, where the apparatus includes a processor, configured to allocate a corresponding IP address to each MPTCP session, where the MPTCP session is an MPTCP session between a first host and a second host, the first host is the host supporting MPTCP, and the second host is the host not supporting MPTCP; and when the MPTCP session is terminated, further configured to release the corresponding IP address allocated to the MPTCP session. The apparatus also includes a transceiver, configured to set up the MPTCP session according to the IP address.

With reference to the second aspect, in a first feasible implementation manner, the transceiver is configured to receive a first MPTCP subflow setup request message from the first host, where the first MPTCP subflow setup request message is used to instruct to set up an initial MPTCP subflow between the first host and the second host; and the processor is configured to allocate the IP address to an MPTCP session to which the first MPTCP subflow setup request message belongs; and further configured to set up an MPTCP subsession with the first host according to the IP address, and set up a TCP session with the second host according to the IP address.

With reference to the second aspect or the first feasible implementation manner of the second aspect, in a second feasible implementation manner, the processor is further configured to: after all MPTCP subflows included in the MPTCP session are terminated, release the IP address; or after the TCP session with the host not supporting MPTCP is terminated, release the IP address.

With reference to the second aspect, in a third feasible implementation manner, the transceiver is further configured to receive a second MPTCP subflow setup request message from the first host, where the second MPTCP subflow setup request message is used to instruct to set up an initial MPTCP subflow between a first interface of the first host and the second host; and the processor is further configured to determine whether another MPTCP session has been set up on the first interface of the first host, and if the another MPTCP session has been set up on the first interface of the first host, allocate the IP address, where the IP address is a first IP address corresponding to the another MPTCP session, or the IP address is a newly allocated second IP address; and further configured to set up an MPTCP subsession with the first host according to the first IP address, and set up a TCP session with the second host according to the first IP address; or set up an MPTCP subsession with the first host according to the second IP address, and set up a TCP session with the second host according to the second IP address.

With reference to the third feasible implementation manner of the second aspect, in a fourth feasible implementation manner, the processor is further configured to: after all the MPTCP sessions corresponding to the first IP address are terminated, release the first IP address; or after all the MPTCP sessions corresponding to the second IP address are terminated, release the second IP address.

With reference to the second aspect, in a fifth feasible implementation manner, the transceiver is further configured to receive a third MPTCP subflow setup request message sent through a second interface, where the third MPTCP subflow setup request message is used to instruct to set up an initial MPTCP subflow between the second interface and the second host; and the processor is further configured to allocate the IP address to the second interface when the second interface belongs to the first host, where the IP address is a third IP address, and the third IP address is an IP address of another interface on which the first host has set up an MPTCP subsession, or the IP address allocated to the second interface is a newly allocated fourth IP address; specifically further configured to allocate the IP address to the second interface when the second interface does not belong to the first host and the second interface belongs to a third host, where the IP address is the newly allocated fourth IP address, and the third host is the host supporting MPTCP; and specifically further configured to set up an MPTCP subsession with the first host according to the third IP address, and set up a TCP session with the second host according to the third IP address; or set up an MPTCP subsession with the first host according to the fourth IP address, and set up a TCP session with the second host according to the fourth IP address; or set up an MPTCP subsession with the third host according to the fourth IP address, and set up a TCP session with the second host according to the fourth IP address.

With reference to the fifth feasible implementation manner of the second aspect, in a sixth feasible implementation manner, the processor is further configured to: after all the MPTCP sessions corresponding to the third IP address are terminated, release the third IP address; or after all the MPTCP sessions corresponding to the fourth IP address are terminated, release the fourth IP address.

With reference to the second aspect, in a seventh feasible implementation manner, the transceiver is further configured to receive a fourth MPTCP subflow setup request message from the first host, where the fourth MPTCP subflow setup request message is used to instruct to set up an initial MPTCP subflow between the first host and the second host, and the fourth MPTCP subflow setup request message includes an IP address of the first host; and further configured to send a reservation request to an IP management device, so that the IP management device does not release the IP address of the first host according to the reservation request before the MPTCP session is terminated; and the processor is further configured to allocate the IP address of the first host to an MPTCP session to which the fourth MPTCP subflow setup request message belongs; and further configured to set up an MPTCP subsession with the first host according to the IP address of the first host, and set up a TCP session with the second host according to the IP address of the first host.

With reference to the seventh feasible implementation manner of the second aspect, in an eighth feasible implementation manner, the transceiver is further configured to: after all MPTCP subflows included in the MPTCP session are terminated, send a cancel reservation request to the IP management device, so that after the IP management device receives the cancel reservation request, the IP management device allows releasing the IP address of the first host; or after the TCP session with the second host is terminated, send a cancel reservation request to the IP management device, so that after the IP management device receives the cancel reservation request, the IP management device allows releasing the IP address of the first host.

A third aspect of the present embodiments provides an address management system for communication over the Multipath Transmission Control Protocol, where the system includes: at least one host supporting MPTCP, at least one host not supporting MPTCP, and the address management apparatus for communication over the Multipath Transmission Control Protocol according to the first aspect or any feasible implementation manner of the first aspect, or the address management apparatus for communication over the Multipath Transmission Control Protocol according to the second aspect or any feasible implementation manner of the second aspect.

With reference to the third aspect, in a first possible implementation manner, the system further includes: an IP management device, configured to: after an MPTCP session is terminated, release an IP address allocated to the MPTCP session by the address management apparatus for communication over the Multipath Transmission Control Protocol, where the IP address is used to set up the MPTCP session between the host supporting MPTCP and the host not supporting MPTCP.

A fourth aspect of the present embodiments provides an address management method for communication over the Multipath Transmission Control Protocol, where the method includes: allocating, by an MPTCP proxy device, a corresponding IP address to each MPTCP session, where the MPTCP session is an MPTCP session between a first host and a second host, the first host is the host supporting MPTCP, and the second host is the host not supporting MPTCP; setting up, by the MPTCP proxy device, the MPTCP session according to the IP address; and when the MPTCP session is terminated, releasing, by the MPTCP proxy device, the corresponding IP address allocated to the MPTCP session.

With reference to the fourth aspect, in a first feasible implementation manner, the allocating, by an MPTCP proxy device, a corresponding IP address to each MPTCP session, includes: receiving, by the MPTCP proxy device, a first MPTCP subflow setup request message from the first host, where the first MPTCP subflow setup request message is used to instruct to set up an initial MPTCP subflow between the first host and the second host; and allocating, by the MPTCP proxy device, the IP address to an MPTCP session to which the first MPTCP subflow setup request message belongs; and the setting up, by the MPTCP proxy device, the MPTCP session according to the IP address, includes: setting up, by the MPTCP proxy device, an MPTCP subsession with the first host according to the IP address, and setting up a TCP session with the second host according to the IP address.

With reference to the fourth aspect or the first feasible implementation manner of the fourth aspect, in a second feasible implementation manner, the releasing, by the MPTCP proxy device, the corresponding IP address allocated to the MPTCP session when the MPTCP session is terminated, includes: after all MPTCP subflows included in the MPTCP session are terminated, releasing, by the MPTCP proxy device, the IP address; or after the TCP session between the MPTCP proxy device and the host not supporting MPTCP is terminated, releasing, by the MPTCP proxy device, the IP address.

With reference to the fourth aspect, in a third feasible implementation manner, the allocating, by an MPTCP proxy device, a corresponding IP address to each MPTCP session, includes: receiving, by the MPTCP proxy device, a second MPTCP subflow setup request message from the first host, where the second MPTCP subflow setup request message is used to instruct to set up an initial MPTCP subflow between a first interface of the first host and the second host; determining, by the MPTCP proxy device, whether another MPTCP session has been set up on the first interface of the first host; and if the another MPTCP session has been set up on the first interface of the first host, allocating, by the MPTCP proxy device, the IP address, where the IP address is a first IP address corresponding to the another MPTCP session, or the IP address is a newly allocated second IP address; and the setting up, by the MPTCP proxy device, the MPTCP session according to the IP address, includes: setting up, by the MPTCP proxy device, an MPTCP subsession with the first host according to the first IP address, and setting up a TCP session with the second host according to the first IP address; or setting up, by the MPTCP proxy device, an MPTCP subsession with the first host according to the second IP address, and setting up a TCP session with the second host according to the second IP address.

With reference to the third feasible implementation manner of the fourth aspect, in a fourth feasible implementation manner, the releasing, by the MPTCP proxy device, the corresponding IP address allocated to the MPTCP session when the MPTCP session is terminated, includes: after all the MPTCP sessions corresponding to the first IP address are terminated, releasing, by the MPTCP proxy device, the first IP address; or after all the MPTCP sessions corresponding to the second IP address are terminated, releasing, by the MPTCP proxy device, the second IP address.

With reference to the fourth aspect, in a fifth feasible implementation manner, the allocating, by an MPTCP proxy device, a corresponding IP address to each MPTCP session, includes: receiving, by the MPTCP proxy device, a third MPTCP subflow setup request message sent through a second interface, where the third MPTCP subflow setup request message is used to instruct to set up an initial MPTCP subflow between the second interface and the second host; when the second interface belongs to the first host, allocating, by the MPTCP proxy device, the IP address to the second interface, where the IP address is a third IP address, and the third IP address is an IP address of another interface on which the first host has set up an MPTCP subsession, or the IP address allocated to the second interface is a newly allocated fourth IP address; and when the second interface does not belong to the first host and the second interface belongs to a third host, allocating, by the MPTCP proxy device, the IP address to the second interface, where the IP address is the newly allocated fourth IP address, and the third host is the host supporting MPTCP; and the setting up, by the MPTCP proxy device, the MPTCP session according to the IP address, includes: setting up, by the MPTCP proxy device, an MPTCP subsession with the first host according to the third IP address, and setting up a TCP session with the second host according to the third IP address; or setting up, by the MPTCP proxy device, an MPTCP subsession with the first host according to the fourth IP address, and setting up a TCP session with the second host according to the fourth IP address; or setting up, by the MPTCP proxy device, an MPTCP subsession with the third host according to the fourth IP address, and setting up a TCP session with the second host according to the fourth IP address.

With reference to the fifth feasible implementation manner of the fourth aspect, in a sixth feasible implementation manner, the releasing, by the MPTCP proxy device, the corresponding IP address allocated to the MPTCP session when the MPTCP session is terminated, includes: after all the MPTCP sessions corresponding to the third IP address are terminated, releasing, by the MPTCP proxy device, the third IP address; or after all the MPTCP sessions corresponding to the fourth IP address are terminated, releasing, by the MPTCP proxy device, the fourth IP address.

With reference to the fourth aspect, in a seventh feasible implementation manner, the allocating, by an MPTCP proxy device, a corresponding IP address to each MPTCP session, includes: receiving, by the MPTCP proxy device, a fourth MPTCP subflow setup request message from the first host, where the fourth MPTCP subflow setup request message is used to instruct to set up an initial MPTCP subflow between the first host and the second host, and the fourth MPTCP subflow setup request message includes an IP address of the first host; allocating, by the MPTCP proxy device, the IP address of the first host to an MPTCP session to which the fourth MPTCP subflow setup request message belongs; and sending, by the MPTCP proxy device, a reservation request to an IP management device, so that the IP management device does not release the IP address of the first host according to the reservation request before the MPTCP session is terminated; and the setting up, by the MPTCP proxy device, the MPTCP session according to the IP address, includes: setting up, by the MPTCP proxy device, an MPTCP subsession with the first host according to the IP address of the first host, and setting up a TCP session with the second host according to the IP address of the first host.

With reference to the seventh feasible implementation manner of the fourth aspect, in an eighth feasible implementation manner, the releasing, by the MPTCP proxy device, the corresponding IP address allocated to the MPTCP session when the MPTCP session is terminated, includes: after all MPTCP subflows included in the MPTCP session are terminated, sending, by the MPTCP proxy device, a cancel reservation request to the IP management device, so that after the IP management device receives the cancel reservation request, the IP management device allows releasing the IP address of the first host; or after the TCP session between the MPTCP proxy device and the second host is terminated, sending, by the MPTCP proxy device, a cancel reservation request to the IP management device, so that after the IP management device receives the cancel reservation request, the IP management device allows releasing the IP address of the first host.

The embodiments of the present invention provide an address management apparatus, system, and method for communication over the Multipath Transmission Control Protocol. A processing module allocates a corresponding IP address to each MPTCP session, where the MPTCP session is an MPTCP session between a first host and a second host, the first host is the host supporting MPTCP, and the second host is the host not supporting MPTCP; when the MPTCP session is terminated, the processing module releases the corresponding IP address allocated to the MPTCP session; and a transceiver module sets up the MPTCP session according to the IP address. It is ensured that in a communication process of an MPTCP session, an IP address used for setting up a TCP session between an MPTCP proxy device and a host not supporting MPTCP is not released. Therefore, reliability of an MPTCP session between an MPTCP host and a host not supporting MPTCP is improved, and transmission performance of the MPTCP session is enhanced.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present embodiments.

In the standard Transmission Control Protocol (TCP), each connection uses only one path for transmission. However, in a new mobile Internet environment, different radio access technologies converge, and a communications terminal has multiple network interfaces, for example, Wi-Fi and third generation (3G) interfaces. In this case, multiple available paths exist between two hosts that communicate with each other. If only one path is used still according to the standard TCP protocol, other path resources are wasted. In addition, as more application programs on a wireless terminal require Internet access currently, if these application programs can simultaneously perform access by using multiple paths of different interfaces, higher-level user experience may be ensured, and adverse impact caused by features of a link change, a high bit error rate, and the like to a wireless network may be reduced. For this purpose, the internet engineering task force (IETF) has established a Multipath Transmission Control Protocol (MPTCP for short) working group to study multipath TCP.

Figure 1:
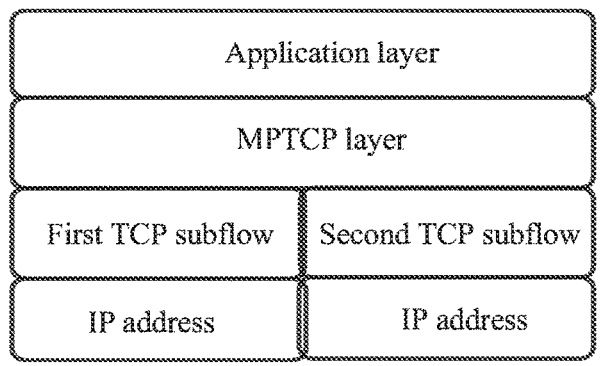
FIG. 1 is a schematic diagram of a Multipath Transmission Control Protocol (MPTCP) protocol stack.

FIG. 1 is a schematic diagram of an MPTCP protocol stack. Referring to FIG. 1, a core idea of MPTCP is to add, between an application layer and a transmission layer, an MPTCP layer supporting multipath transmission. In essence, MPTCP splits conventional TCP data into multiple TCP subflows (for example, a first TCP subflow and a second subflow, and each TCP subflow corresponds to one IP address). Different TCP subflows are transmitted along different paths and aggregated on a receiving host. An original TCP layer is effective only on a subflow. Therefore, MPTCP can be compatible with original TCP and transparent to other layers in a network, and great changes do not need to be made to the network.

Figure 2:
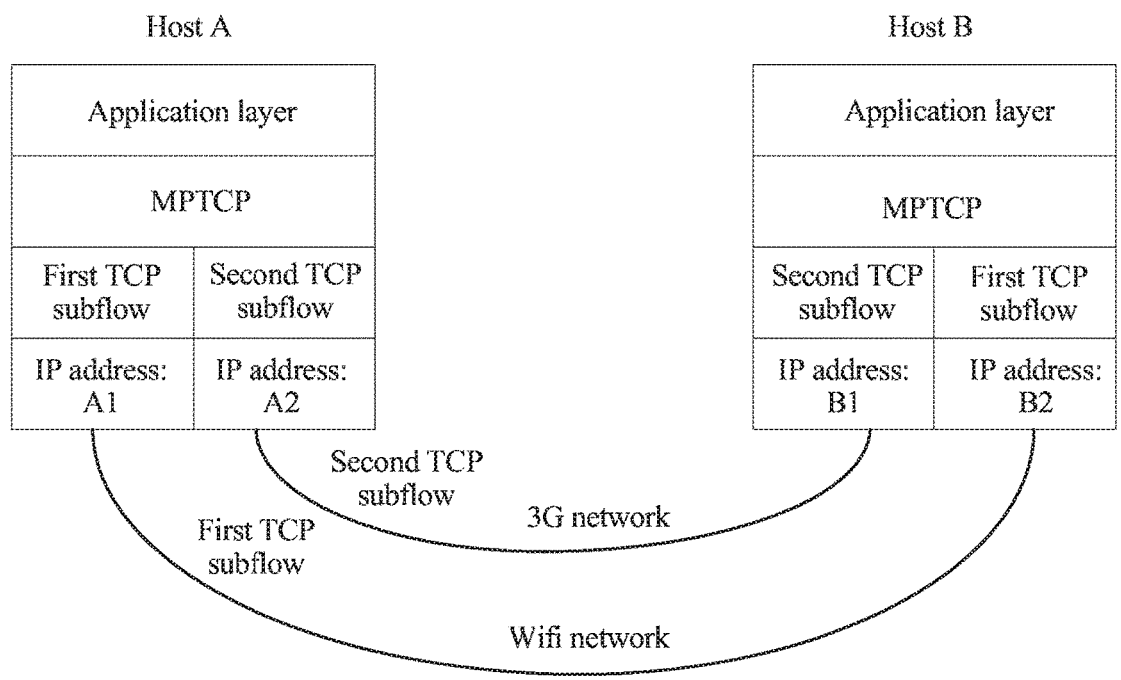
FIG. 2 is a schematic diagram of an MPTCP application scenario.

FIG. 2 is a schematic diagram of an MPTCP usage scenario. FIG. 2 provides a typical MPTCP application scenario. Host A and host B are two hosts that communicate with each other and have multiple interfaces (including one Wi-Fi interface and one 3G interface). Internet protocol (IP) addresses of the interfaces of host A are A1, A2, IP addresses of the interfaces of host B are B1 and B2. When host A needs to use MPTCP to communicate with host B, host A may simultaneously use a Wi-Fi interface and a 3G interface to communicate with host B, that is, set up a TCP subflow on the Wi-Fi interface and a TCP subflow on the 3G interface (that is, a first TCP subflow and a second TCP subflow). Therefore, the host can simultaneously use the two interfaces to perform communication, and communication bandwidth is increased.

Although an MPTCP technology may allow a terminal to simultaneously use multiple interfaces to perform communication, MPTCP requires that two parties participating in communication should both support MPTCP. When a communication party does not support MPTCP, MPTCP cannot be used to perform communication. Communication over MPTCP requires that two communication parties should both support the MPTCP protocol. In order that a host having an MPTCP capability can communicate with a host not having an MPTCP capability, a concept of an MPTCP proxy is put forward. A final objective of the MPTCP proxy is to implement mapping between an MPTCP session and a TCP session, between a host supporting MPTCP and a host supporting TCP.

Figure 3:
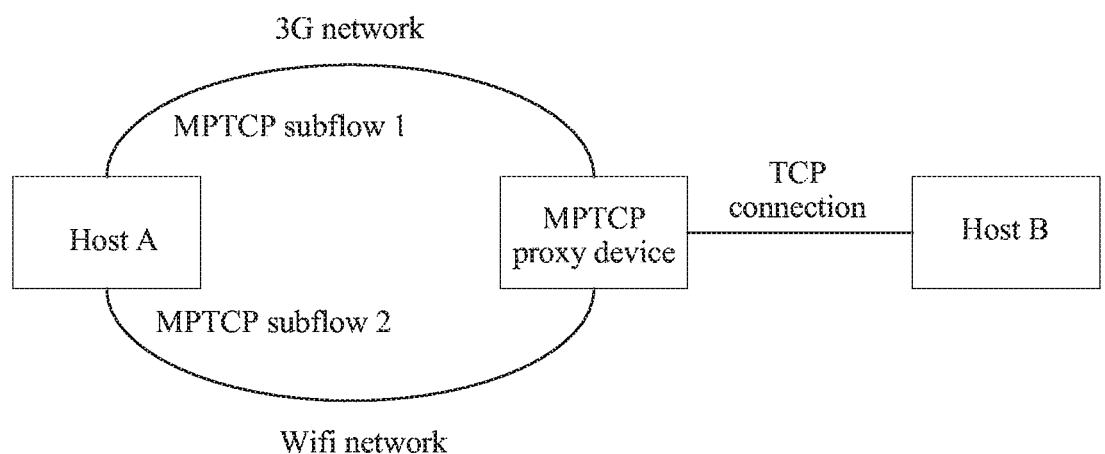
FIG. 3 is a schematic diagram of a function of an MPTCP proxy device.

FIG. 3 is a schematic diagram of a function of an MPTCP proxy device. Referring to FIG. 3, host A supports the MPTCP protocol, but host B supports the conventional TCP protocol. In order that MPTCP can be used for communication (for example, an MPTCP subflow 1 and an MPTCP subflow 2) between host A and host B, an MPTCP proxy device is deployed between host A and host B, and the MPTCP proxy device has an MPTCP proxy function. In place of host B, the MPTCP proxy device sets up an MPTCP connection or session with host A. The MPTCP proxy device sets up a TCP connection or session with host B. In the communication process, the MPTCP proxy device is responsible for performing mapping or conversion between the MPTCP session and the TCP session.

Figure 4:
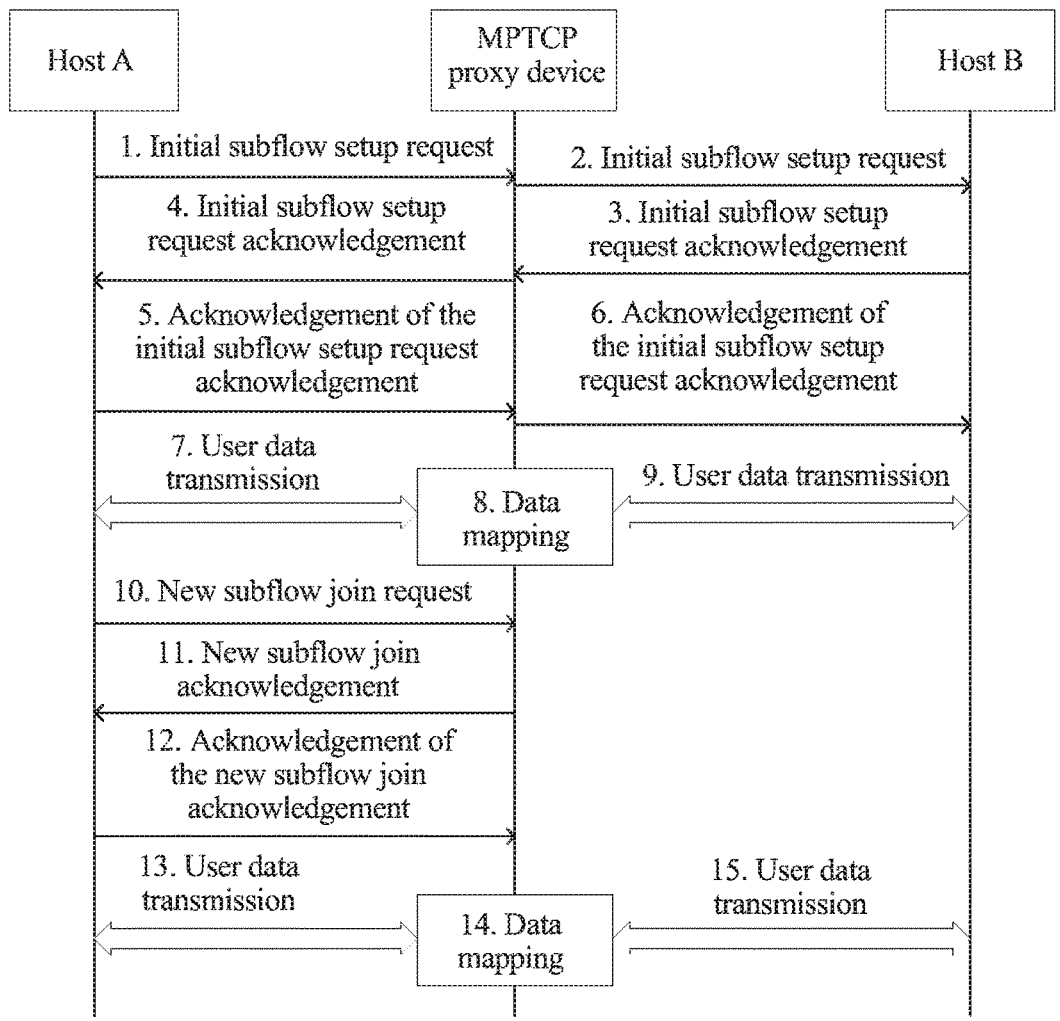
FIG. 4 is a schematic interaction diagram of an MPTCP proxy device in the prior art.

In the prior art, after the MPTCP proxy device receives an MPTCP connection setup request initiated by the host (host A) supporting MPTCP, the MPTCP proxy device uses an IP address that is of host A and is carried in the connection request to set up a TCP connection to the host (host B) not supporting MPTCP. FIG. 4 is a schematic interaction diagram of the MPTCP proxy device in the prior art. Herein, only a case of two subflows initiated by the host (host A) supporting MPTCP is shown. There is no great difference between a case of setup of more subflows and the case of setup of two subflows. Interaction of the MPTCP proxy device is as follows:

Step 1: Host A sends an initial subflow setup request [SYN+MP_CAPABLE(src=IP-A1)] to the MPTCP proxy device.

Specifically, IP-A1 is an IP address of an interface of host A. From a perspective of the MPTCP proxy device, the IP-A1 may be used to identify the interface.

Step 2: The MPTCP proxy device sends an initial subflow setup request [SYN+MP_CAPABLE(src=IP-A1)] to host B.

It should be noted that, host B supports only TCP.

Step 3: Host B sends an initial subflow setup request acknowledgement (SYN+ACK) to the MPTCP proxy device.

Step 4: The MPTCP proxy device sends an initial subflow setup request acknowledgement (SYN+ACK+MP_CAPABLE) to host A.

Step 5: Host A sends an acknowledgement (ACK+MP_CAPABLE) of the initial subflow setup request acknowledgement to the MPTCP proxy device.

Step 6: The MPTCP proxy device sends an acknowledgement (ACK) of the initial subflow setup request acknowledgement to host B.

Step 7: Host A performs user data transmission with the MPTCP proxy device.

Step 8: The MPTCP proxy device performs data mapping.

Step 9: The MPTCP proxy device performs user data transmission with host B.

Step 10: Host A sends a new subflow join request [SYN+MP_JOIN(src=IP-A2)] to the MPTCP proxy device.

Step 11: The MPTCP proxy device sends a new subflow join acknowledgement (SYN+ACK+MP_JOIN) to host A.

Step 12: Host A sends an acknowledgement (ACK+MP_JOIN) of the new subflow join acknowledgement to the MPTCP proxy device.

Step 13: Host A performs user data transmission with the MPTCP proxy device.

Step 14: The MPTCP proxy device performs data mapping.

Step 15: The MPTCP proxy device performs user data transmission with host B.

An MPTCP connection setup process is similar to a TCP connection setup process, and both are implemented by using a three-way handshake. Referring to step 1, a difference lies in that MPTCP defines a new TCP option MP_CAPABLE, used to indicate that the connection setup process is to set up an MPTCP connection. If MPTCP is not supported, a communication peer end ignores the MP_CAPABLE, and returns an ordinary TCP handshake message. Therefore, the host supporting MPTCP may determine whether the communication peer end supports MPTCP, and set up the MPTCP connection if the communication peer end supports MPTCP, or set up an ordinary TCP connection if the communication peer end does not support MPTCP. A function of the MPTCP proxy device is to return, in place of the host not supporting MPTCP, the MP_CAPABLE to the host supporting MPTCP (referring to step 4), so that the host supporting MPTCP considers that the communication peer end is a host supporting MPTCP, and further that the MPTCP connection may be set up.

As shown in FIG. 4, host A supporting MPTCP initiates setup of an initial MPTCP subflow to host B not supporting MPTCP. The MPTCP proxy device intercepts a three-way handshake message between host A and host B. When the MPTCP proxy device finds that a SYN+ACK message returned by host B does not carry an MP_CAPABLE option, the MPTCP proxy device considers that host B does not support an MPTCP function (referring to step 3). In this case, in place of host B, the MPTCP proxy device returns a SYN+ACK+MP_CAPABLE message to host A (referring to step 4). After the three-way handshake, an MPTCP connection is set up between host A and the MPTCP proxy device, and a TCP connection is set up between the MPTCP proxy device and host B. The MPTCP proxy device is responsible for performing data mapping between the two connections.

In a mechanism of the conventional MPTCP proxy device, an IP address of a first MPTCP subflow of the host supporting MPTCP is used to set up a TCP session. However, when the host supporting MPTCP stops using an interface (interface) corresponding to the IP address, it is possible that the IP address is released or occupied by another host. This may affect communication of the TCP session that is set up between the MPTCP proxy device and the host not supporting MPTCP.

Figure 5:
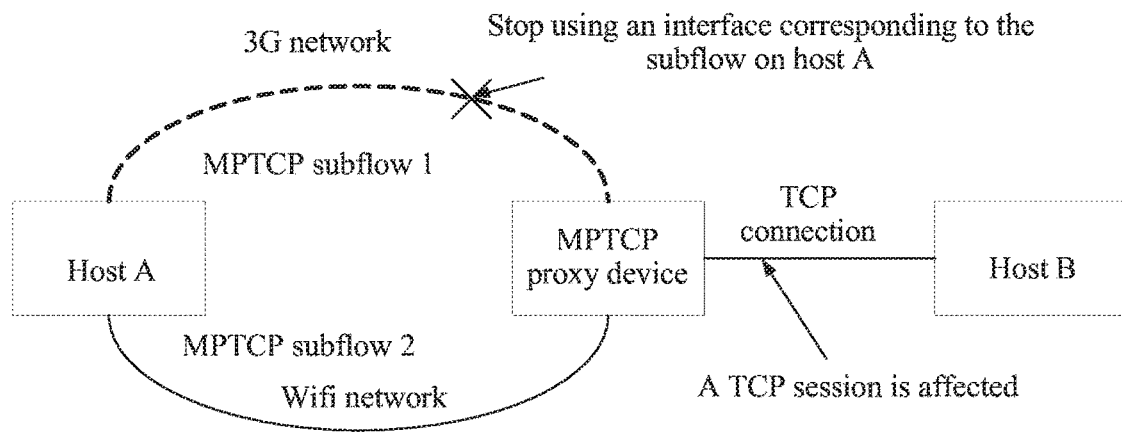
FIG. 5 is a schematic diagram of a problem of an MPTCP proxy device in the prior art.

FIG. 5 is a schematic diagram of a problem of the MPTCP proxy device in the prior art. As shown in FIG. 5, host A supporting MPTCP sets up an MPTCP subflow 1 by using a 3G interface, and the MPTCP proxy device uses an IP address of host A, used in the MPTCP subflow 1, to set up a TCP connection to host B not supporting MPTCP. Then host A may further use a Wi-Fi interface to set up an MPTCP subflow 2. In this case, if host A stops using the 3G interface for some reasons, for example, because host A is detached from a 3G network, the IP address of the 3G interface is still used for the TCP connection between the MPTCP proxy device and host B, even if the IP address has been released and allocated to another host. Consequently, an MPTCP communication error occurs.

In view of the foregoing problem, the embodiments of the present invention provide an address management apparatus, system, and method for communication over the Multipath Transmission Control Protocol. The following describes the apparatus, system, and method by using specific embodiments.

Figure 6:
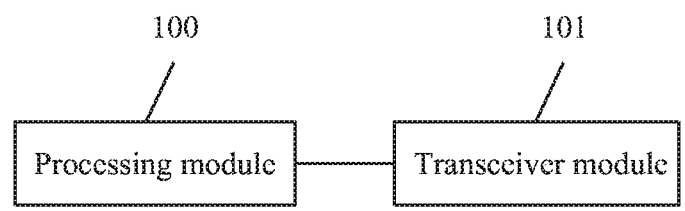
FIG. 6 is a schematic structural diagram of an address management apparatus for communication over the Multipath Transmission Control Protocol according to an embodiment of the present invention.

FIG. 6 is a schematic structural diagram of an address management apparatus for communication over the Multipath Transmission Control Protocol according to an embodiment of the present invention. The apparatus may be an MPTCP proxy device. Referring to FIG. 6, the apparatus includes a processing module 100 and a transceiver module 101.

The processing module 100 is configured to allocate a corresponding IP address to each MPTCP session, where the MPTCP session is an MPTCP session between a first host and a second host, the first host is the host supporting MPTCP, and the second host is the host not supporting MPTCP; and when the MPTCP session is terminated, further configured to release the corresponding IP address allocated to the MPTCP session.

The transceiver module 101 is configured to set up the MPTCP session according to the IP address.

A basic idea of the present embodiments is that, when an address management apparatus for communication over MPTCP detects that a host supporting MPTCP sets up an MPTCP session with a host supporting only TCP but not supporting MPTCP, the MPTCP proxy device allocates a temporary IP address to the session, and uses the IP address to set up a TCP session with the host supporting only TCP but not supporting MPTCP. An emphasis of the present embodiments is how the MPTCP proxy device allocates an IP address to a session initiated by the host supporting MPTCP, and how to release the allocated IP address, namely, management of the IP address.

This embodiment of the present invention provides an address management apparatus for communication over the Multipath Transmission Control Protocol. A processing module allocates a corresponding IP address to each MPTCP session, where the MPTCP session is an MPTCP session between a first host and a second host, the first host is the host supporting MPTCP, and the second host is the host not supporting MPTCP; when the MPTCP session is terminated, the processing module releases the corresponding IP address allocated to the MPTCP session; and a transceiver module sets up the MPTCP session according to the IP address. It is ensured that in a communication process of an MPTCP session, an IP address used for setting up a TCP session between an MPTCP proxy device and a host not supporting MPTCP is not released. Therefore, reliability of an MPTCP session between an MPTCP host and a host not supporting MPTCP is improved, and transmission performance of the MPTCP session is enhanced.

Further, multiple feasible implementation manners may be available for allocating the corresponding IP address to each MPTCP session by the MPTCP proxy device. The following describes an IP address allocation mechanism by using specific embodiments.

Implementation Manner 1.

Referring to FIG. 6, the transceiver module 101 is configured to receive a first MPTCP subflow setup request message from the first host, where the first MPTCP subflow setup request message is used to instruct to set up an initial MPTCP subflow between the first host and the second host; and the processing module 100 is configured to allocate the IP address to an MPTCP session to which the first MPTCP subflow setup request message belongs; and further configured to set up an MPTCP subsession with the first host according to the IP address, and set up a TCP session with the second host according to the IP address.

Further, the processing module 100 is configured to: after all MPTCP subflows included in the MPTCP session are terminated, release the IP address; or after the TCP session with the host not supporting MPTCP is terminated, release the IP address.

Implementation Manner 2.

Referring to FIG. 6, the transceiver module 101 is further configured to receive a second MPTCP subflow setup request message from the first host, where the second MPTCP subflow setup request message is used to instruct to set up an initial MPTCP subflow between a first interface of the first host and the second host; and the processing module 100 is further configured to determine whether another MPTCP session has been set up on the first interface of the first host, and if the another MPTCP session has been set up on the first interface of the first host, allocate the IP address, where the IP address is a first IP address corresponding to the another MPTCP session, or the IP address is a newly allocated second IP address; and further configured to set up an MPTCP subsession with the first host according to the first IP address, and set up a TCP session with the second host according to the first IP address; or set up an MPTCP subsession with the first host according to the second IP address, and set up a TCP session with the second host according to the second IP address.

Further, the processing module 100 is further configured to: after all the MPTCP sessions corresponding to the first IP address are terminated, release the first IP address; or after all the MPTCP sessions corresponding to the second IP address are terminated, release the second IP address.

Implementation Manner 3.

Referring to FIG. 6, the transceiver module 101 is further configured to receive a third MPTCP subflow setup request message sent through a second interface, where the third MPTCP subflow setup request message is used to instruct to set up an initial MPTCP subflow between the second interface and the second host; the processing module 100 is further configured to allocate the IP address to the second interface when the second interface belongs to the first host, where the IP address is a third IP address, and the third IP address is an IP address of another interface on which the first host has set up an MPTCP subsession, or the IP address allocated to the second interface is a newly allocated fourth IP address; the processing module 100 is further configured to allocate the IP address to the second interface when the second interface does not belong to the first host and the second interface belongs to a third host, where the IP address is the newly allocated fourth IP address, and the third host is the host supporting MPTCP; and the processing module 100 is further configured to set up an MPTCP subsession with the first host according to the third IP address, and set up a TCP session with the second host according to the third IP address; or set up an MPTCP subsession with the first host according to the fourth IP address, and set up a TCP session with the second host according to the fourth IP address; or set up an MPTCP subsession with the third host according to the fourth IP address, and set up a TCP session with the second host according to the fourth IP address.

Further, the processing module 100 is further configured to: after all the MPTCP sessions corresponding to the third IP address are terminated, release the third IP address; or after all the MPTCP sessions corresponding to the fourth IP address are terminated, release the fourth IP address.

Implementation Manner 4.

Referring to FIG. 6, the transceiver module 101 is further configured to receive a fourth MPTCP subflow setup request message from the first host, where the fourth MPTCP subflow setup request message is used to instruct to set up an initial MPTCP subflow between the first host and the second host, and the fourth MPTCP subflow setup request message includes an IP address of the first host; and further configured to send a reservation request to an IP management device, so that the IP management device does not release the IP address of the first host according to the reservation request before the MPTCP session is terminated; and the processing module 100 is further configured to allocate the IP address of the first host to an MPTCP session to which the fourth MPTCP subflow setup request message belongs; and further configured to set up an MPTCP subsession with the first host according to the IP address of the first host, and set up a TCP session with the second host according to the IP address of the first host.

Further, the transceiver module 101 is further configured to: after all MPTCP subflows included in the MPTCP session are terminated, send a cancel reservation request to the IP management device, so that after the IP management device receives the cancel reservation request, the IP management device allows releasing the IP address of the first host; or after the TCP session with the second host is terminated, send a cancel reservation request to the IP management device, so that after the IP management device receives the cancel reservation request, the IP management device allows releasing the IP address of the first host.

Figure 7:
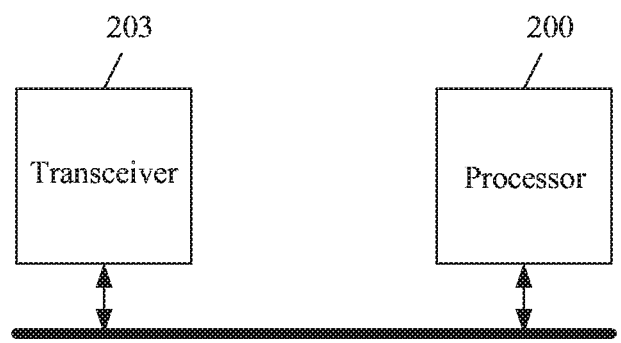
FIG. 7 is a schematic structural diagram of another address management apparatus for communication over the Multipath Transmission Control Protocol according to an embodiment of the present invention.

FIG. 7 is a schematic structural diagram of another address management apparatus for communication over the Multipath Transmission Control Protocol according to an embodiment of the present invention. Referring to FIG. 7, the apparatus includes a processor 200 and a transceiver 203.

The processor 200 is configured to allocate a corresponding IP address to each MPTCP session, where the MPTCP session is an MPTCP session between a first host and a second host, the first host is the host supporting MPTCP, and the second host is the host not supporting MPTCP; and when the MPTCP session is terminated, further configured to release the corresponding IP address allocated to the MPTCP session.

The transceiver 203 is configured to set up the MPTCP session according to the IP address.

This embodiment of the present invention provides an address management apparatus for communication over the Multipath Transmission Control Protocol. The processor allocates a corresponding IP address to each MPTCP session, where the MPTCP session is an MPTCP session between a first host and a second host, the first host is the host supporting MPTCP, and the second host is the host not supporting MPTCP; when the MPTCP session is terminated, the processor releases the corresponding IP address allocated to the MPTCP session; and the transceiver sets up the MPTCP session according to the IP address. It is ensured that in a communication process of an MPTCP session, an IP address used for setting up a TCP session between an MPTCP proxy device and a host not supporting MPTCP is not released. Therefore, reliability of an MPTCP session between an MPTCP host and a host not supporting MPTCP is improved, and transmission performance of the MPTCP session is enhanced.

Optionally, a feasible implementation manner for allocating the IP address and setting up the MPTCP session is as follows.

Further, the transceiver 203 is configured to receive a first MPTCP subflow setup request message from the first host, where the first MPTCP subflow setup request message is used to instruct to set up an initial MPTCP subflow between the first host and the second host; and the processor 200 is configured to allocate the IP address to an MPTCP session to which the first MPTCP subflow setup request message belongs; and further configured to set up an MPTCP subsession with the first host according to the IP address, and set up a TCP session with the second host according to the IP address.

Optionally, the following two feasible implementation manners are available for releasing the IP address.

The processor 200 is further configured to: after all MPTCP subflows included in the MPTCP session are terminated, release the IP address; or after the TCP session with the host not supporting MPTCP is terminated, release the IP address.

Optionally, another feasible implementation manner for allocating the IP address and setting up the MPTCP session is as follows.

The transceiver 203 is configured to receive a second MPTCP subflow setup request message from the first host, where the second MPTCP subflow setup request message is used to instruct to set up an initial MPTCP subflow between a first interface of the first host and the second host; and the processor 200 is further configured to determine whether another MPTCP session has been set up on the first interface of the first host, and if the another MPTCP session has been set up on the first interface of the first host, allocate the IP address, where the IP address is a first IP address corresponding to the another MPTCP session, or the IP address is a newly allocated second IP address; and further configured to set up an MPTCP subsession with the first host according to the first IP address, and set up a TCP session with the second host according to the first IP address; or set up an MPTCP subsession with the first host according to the second IP address, and set up a TCP session with the second host according to the second IP address.

Optionally, the following two feasible implementation manners are available for releasing the IP address.

The processor 200 is further configured to: after all the MPTCP sessions corresponding to the first IP address are terminated, release the first IP address; or after all the MPTCP sessions corresponding to the second IP address are terminated, release the second IP address.

Optionally, another feasible implementation manner for allocating the IP address and setting up the MPTCP session is as follows.

The transceiver 203 is configured to receive a third MPTCP subflow setup request message sent through a second interface, where the third MPTCP subflow setup request message is used to instruct to set up an initial MPTCP subflow between the second interface and the second host; and the processor 200 is further configured to allocate the IP address to the second interface when the second interface belongs to the first host, where the IP address is a third IP address, and the third IP address is an IP address of another interface on which the first host has set up an MPTCP subsession, or the IP address allocated to the second interface is a newly allocated fourth IP address; specifically further configured to allocate the IP address to the second interface when the second interface does not belong to the first host and the second interface belongs to a third host, where the IP address is the newly allocated fourth IP address, and the third host is the host supporting MPTCP; and specifically further configured to set up an MPTCP subsession with the first host according to the third IP address, and set up a TCP session with the second host according to the third IP address; or set up an MPTCP subsession with the first host according to the fourth IP address, and set up a TCP session with the second host according to the fourth IP address; or set up an MPTCP subsession with the third host according to the fourth IP address, and set up a TCP session with the second host according to the fourth IP address.

It should be noted that, when the MPTCP proxy device determines that the second interface and the another interface on which the MPTCP subsession has been set up do not belong to the first host, the MPTCP proxy device can learn that the second interface belongs to another host, for example, the third host. Therefore, no additional step or function is required for determining the host to which the second interface belongs.

Optionally, the following two feasible implementation manners are available for releasing the IP address.

The processor 200 is further configured to: after all the MPTCP sessions corresponding to the third IP address are terminated, release the third IP address; or after all the MPTCP sessions corresponding to the fourth IP address are terminated, release the fourth IP address.

Optionally, another feasible implementation manner for allocating the IP address and setting up the MPTCP session is as follows.

The transceiver 203 is configured to receive a fourth MPTCP subflow setup request message from the first host, where the fourth MPTCP subflow setup request message is used to instruct to set up an initial MPTCP subflow between the first host and the second host, and the fourth MPTCP subflow setup request message includes an IP address of the first host; and further configured to send a reservation request to an IP management device, so that the IP management device does not release the IP address of the first host according to the reservation request before the MPTCP session is terminated; and the processor 200 is configured to allocate the IP address of the first host to an MPTCP session to which the fourth MPTCP subflow setup request message belongs; and further configured to set up an MPTCP subsession with the first host according to the IP address of the first host, and set up a TCP session with the second host according to the IP address of the first host.

Optionally, the following two feasible implementation manners are available for releasing the IP address.

The transceiver 203 is further configured to: after all MPTCP subflows included in the MPTCP session are terminated, send a cancel reservation request to the IP management device, so that after the IP management device receives the cancel reservation request, the IP management device allows releasing the IP address of the first host; or after the TCP session with the second host is terminated, send a cancel reservation request to the IP management device, so that after the IP management device receives the cancel reservation request, the IP management device allows releasing the IP address of the first host.

Figure 8:
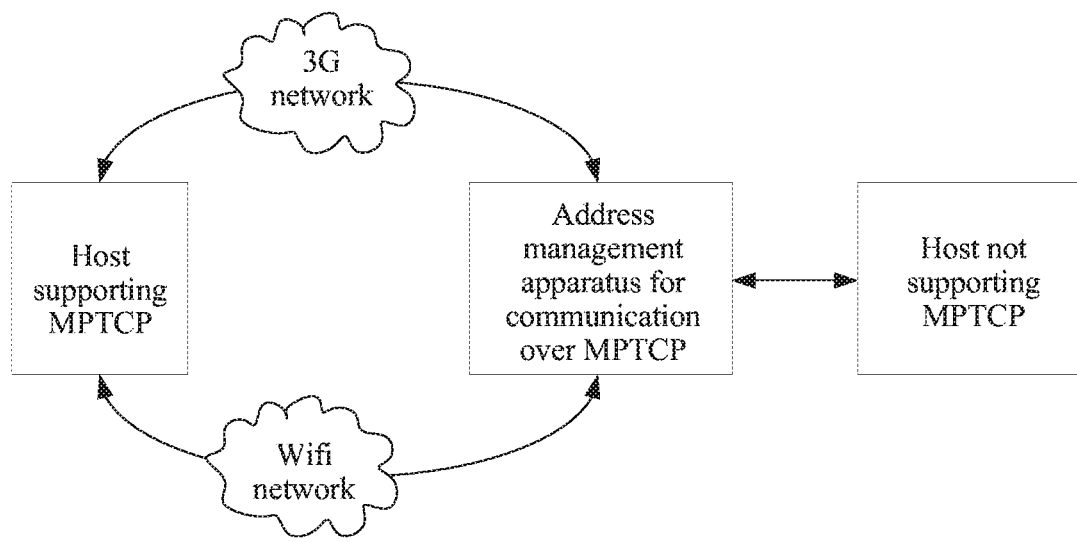
FIG. 8 is a schematic diagram of an address management system for communication over the Multipath Transmission Control Protocol according to an embodiment of the present invention.

FIG. 8 is a schematic diagram of an address management system for communication over the Multipath Transmission Control Protocol according to an embodiment of the present invention. Referring to FIG. 8, a host supporting MPTCP, at least one host not supporting MPTCP, and an address management apparatus for communication over MPTCP are used as an example. A specific quantity of the foregoing devices is determined according to a specific situation in a specific scenario, and is not limited herein. Referring to FIG. 8, the system includes: at least one host supporting MPTCP, at least one host not supporting MPTCP, and the address management apparatus for communication over the Multipath Transmission Control Protocol as shown in FIG. 6 in the foregoing embodiment, or the address management apparatus for communication over the Multipath Transmission Control Protocol may have the structure shown in FIG. 7.

It should be noted that, in FIG. 8, only two paths of a 3G network and a Wifi network are shown between the host supporting MPTCP and the address management apparatus for communication over MPTCP. Actually, paths of different network systems are not limited to the two types, and the paths in FIG. 8 are used only as an example. In this embodiment of the present invention, specific types and the quantity of multiple paths are not limited.

This embodiment of the present invention provides an address management system for communication over the Multipath Transmission Control Protocol. An address management apparatus for communication over the Multipath Transmission Control Protocol allocates a corresponding IP address to each MPTCP session, where the MPTCP session is an MPTCP session between a host supporting MPTCP and a host not supporting MPTCP. The MPTCP proxy device sets up the MPTCP session. When the MPTCP session is terminated, the MPTCP proxy device releases the IP address allocated to the MPTCP session. It is ensured that in a communication process of an MPTCP session, an IP address used for setting up a TCP session between an MPTCP proxy device and a host not supporting MPTCP is not released. Therefore, reliability of an MPTCP session between an MPTCP host and a host not supporting MPTCP is improved, and transmission performance of the MPTCP session is enhanced.

Figure 9:
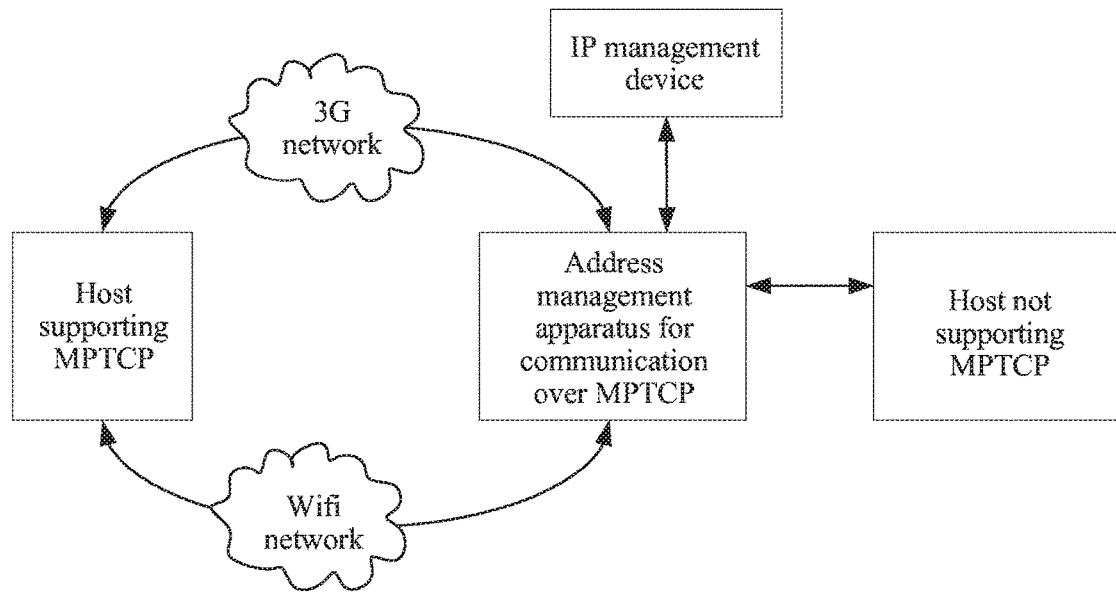
FIG. 9 is a schematic diagram of another address management system for communication over the Multipath Transmission Control Protocol according to an embodiment of the present invention.

Preferably, because the foregoing address management apparatus for communication over the Multipath Transmission Control Protocol needs to maintain an address pool to implement an IP address allocation function, if the address management apparatus for communication over the Multipath Transmission Control Protocol does not have an address pool, to achieve the foregoing technical effect, a feasible manner is to add an IP management device to the system. FIG. 9 is a schematic diagram of another address management system for communication over the Multipath Transmission Control Protocol according to an embodiment of the present invention. Referring to FIG. 9, the system further includes: an IP management device, configured to: after an MPTCP session is terminated, release an IP address allocated to the MPTCP session by the address management apparatus for communication over the Multipath Transmission Control Protocol, where the IP address is used to set up the MPTCP session between the host supporting MPTCP and the host not supporting MPTCP.

It should be noted that, an interaction procedure between the IP management device and the address management apparatus for communication over the Multipath Transmission Control Protocol is described in detail later. Details are not described herein.

Figure 10:
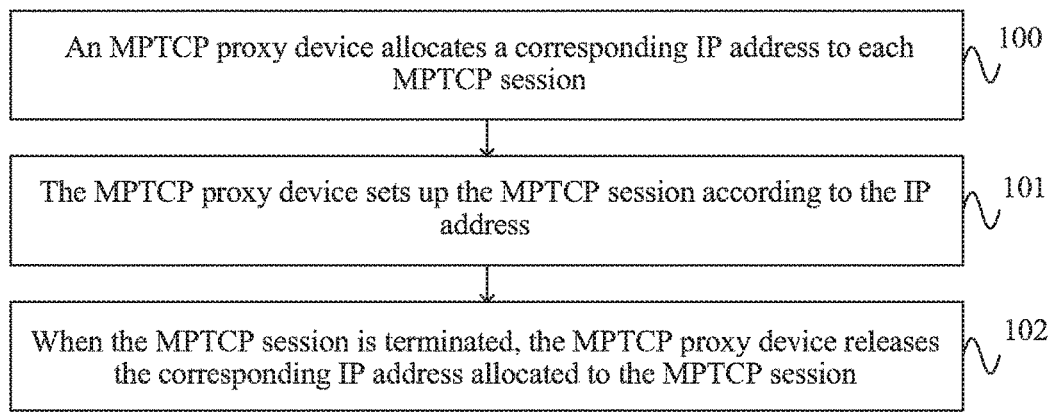
FIG. 10 is a schematic flowchart of an address management method for communication over the Multipath Transmission Control Protocol according to an embodiment of the present invention.

FIG. 10 is a schematic flowchart of an address management method for communication over the Multipath Transmission Control Protocol according to an embodiment of the present invention. The method is performed by an address management apparatus for communication over the Multipath Transmission Control Protocol, and the address management apparatus for communication over the Multipath Transmission Control Protocol may be an MPTCP proxy device. Referring to FIG. 10, the method includes the following steps:

Step 100: An MPTCP proxy device allocates a corresponding IP address to each MPTCP session.

The MPTCP session is an MPTCP session between a first host and a second host, the first host is the host supporting MPTCP, and the second host is the host not supporting MPTCP.

Step 101: The MPTCP proxy device sets up the MPTCP session according to the IP address.

Step 102: When the MPTCP session is terminated, the MPTCP proxy device releases the corresponding IP address allocated to the MPTCP session.

A basic idea of the present embodiments is that, when an MPTCP proxy device detects that a host supporting MPTCP sets up an MPTCP session with a host supporting only TCP but not supporting MPTCP, the MPTCP proxy device allocates a temporary IP address to the session, and uses the IP address to set up a TCP session with the host supporting only TCP but not supporting MPTCP. An emphasis of the present embodiments is how the MPTCP proxy device allocates an IP address to a session initiated by the host supporting MPTCP, and how to release the allocated IP address, namely, management of the IP address.

This embodiment of the present invention provides an address management method for communication over the Multipath Transmission Control Protocol. An MPTCP proxy device allocates a corresponding IP address to each MPTCP session, where the MPTCP session is an MPTCP session between a first host and a second host, the first host is a host supporting MPTCP, and the second host is a host not supporting MPTCP; the MPTCP proxy device sets up the MPTCP session according to the IP address; and when the MPTCP session is terminated, the MPTCP proxy device releases the corresponding IP address allocated to the MPTCP session. It is ensured that in a communication process of an MPTCP session, an IP address used for setting up a TCP session between an MPTCP proxy device and a host not supporting MPTCP is not released. Therefore, reliability of an MPTCP session between an MPTCP host and a host not supporting MPTCP is improved, and transmission performance of the MPTCP session is enhanced.

Further, multiple feasible implementation manners may be available for allocating the corresponding IP address to each MPTCP session by the MPTCP proxy device. The following describes an IP address allocation mechanism by using specific embodiments.

This embodiment provides an IP address allocation method using an MPTCP session as a granularity. That is, the MPTCP proxy device allocates a unique IP address to each MPTCP session to set up a TCP session with a host not supporting MPTCP.

Figure 11:
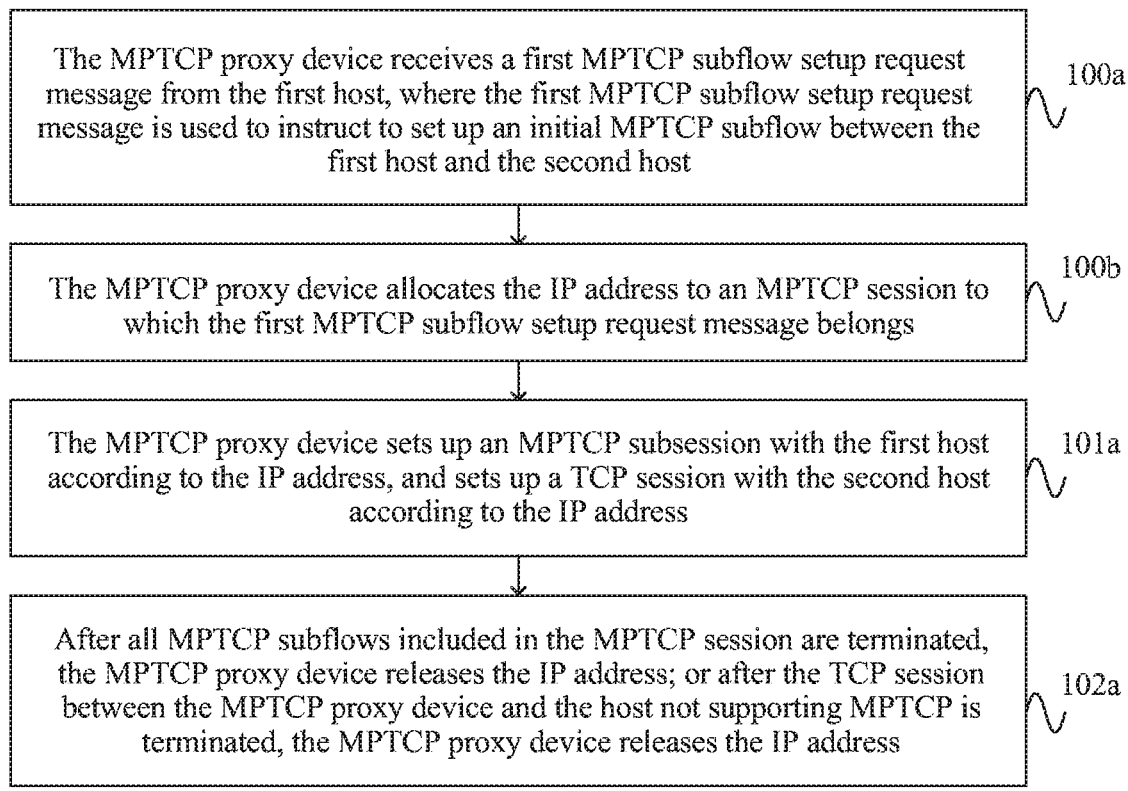
FIG. 11 is a schematic flowchart of another address management method for communication over the Multipath Transmission Control Protocol according to an embodiment of the present invention.

Specifically, on a basis of FIG. 10, FIG. 11 is a schematic flowchart of another address management method for communication over the Multipath Transmission Control Protocol according to an embodiment of the present invention. Referring to FIG. 11, in this embodiment, a possible implementation manner of step 100 in FIG. 10 is.

Step bow: The MPTCP proxy device receives a first MPTCP subflow setup request message from the first host, where the first MPTCP subflow setup request message is used to instruct to set up an initial MPTCP subflow between the first host and the second host.

Step 100*b*: The MPTCP proxy device allocates the IP address to an MPTCP session to which the first MPTCP subflow setup request message belongs.

On a basis of step bow and step 100*b*, referring to FIG. 11, a feasible implementation manner of step 101 in FIG. 10 is.

Step 101*a*: The MPTCP proxy device sets up an MPTCP subsession with the first host according to the IP address, and sets up a TCP session with the second host according to the IP address.

Further, referring to FIG. 11, a possible implementation manner of step 102 in FIG. 10 is.

Step 102*a*: After all MPTCP subflows included in the MPTCP session are terminated, the MPTCP proxy device releases the IP address; or after the TCP session between the MPTCP proxy device and the host not supporting MPTCP is terminated, the MPTCP proxy device releases the IP address.

Figure 12:
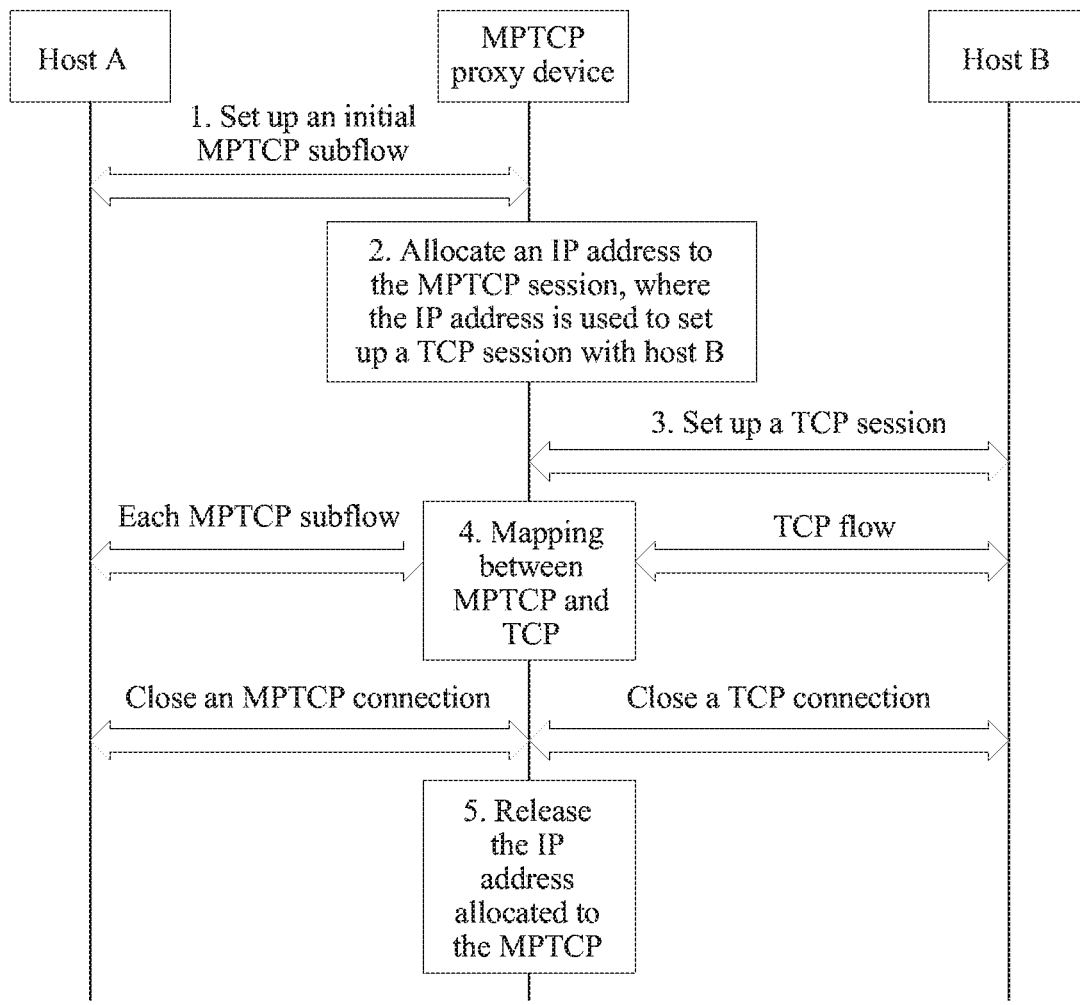
FIG. 12 is a schematic interaction diagram of an address management method for communication over the Multipath Transmission Control Protocol according to an embodiment of the present invention.

FIG. 12 is a schematic interaction diagram of an address management method for communication over the Multipath Transmission Control Protocol according to an embodiment of the present invention. Referring to FIG. 12, the interaction procedure includes the following steps.

Step 1: Host A sets up an initial MPTCP subflow with an MPTCP proxy device.

Specifically, host A supporting MPTCP initiates a process of setting up an initial MPTCP subflow. The process is consistent with the process shown in FIG. 4.

Step 2: The MPTCP proxy device allocates an IP address to an MPTCP session, where the IP address is used to set up a TCP session with host B.

Specifically, the MPTCP proxy device may detect that host A wants to set up an MPTCP session with another host B not supporting MPTCP. Therefore, the MPTCP proxy device needs to provide a proxy function for the MPTCP session, that is, in place of host B, set up an MPTCP session with host A, and in place of host A, set up a TCP session with host B. The MPTCP proxy device allocates an IP address to an MPTCP session to which an initial subflow setup request from host A belongs.

Step 3: The MPTCP proxy device sets up a TCP session with host B.

Specifically, the MPTCP proxy device uses the allocated IP address to set up the TCP session with host B.

Step 4: The MPTCP proxy device maintains a mapping between MPTCP and TCP.

Specifically, during setup of a subsequent new MPTCP subflow coming from host A and belonging to an MPTCP session that has been set up, the MPTCP proxy device maps data transmitted in all MPTCP subflows that belong to a same MPTCP session, to a TCP session corresponding to the MPTCP session.

When there is a new MPTCP session setup request (the session request may come from any host supporting MPTCP), if the MPTCP proxy device determines that the new MPTCP session is a session between a host supporting MPTCP and a host not supporting MPTCP, the MPTCP proxy device allocates a new IP address to the MPTCP session. That is, the MPTCP proxy device allocates an IP address by using the MPTCP session as a granularity.

Step 5: The MPTCP proxy device releases the IP address allocated to the MPTCP session.

Specifically, termination of an MPTCP session is a trigger condition for releasing an IP address. Two manners may be used for determining termination of an MPTCP session. The first manner is: after all MPTCP subflows included in an MPTCP session are terminated, determining termination of the MPTCP session. The second manner is: after a TCP session between the MPTCP proxy device and a host supporting TCP is terminated, determining termination of an MPTCP session. After the MPTCP proxy device detects that an MPTCP session is terminated, the MPTCP proxy device may release an IP address allocated to the MPTCP session.

This embodiment provides an IP address allocation method using a network interface (Interface) of a host as a granularity.

Figure 13:
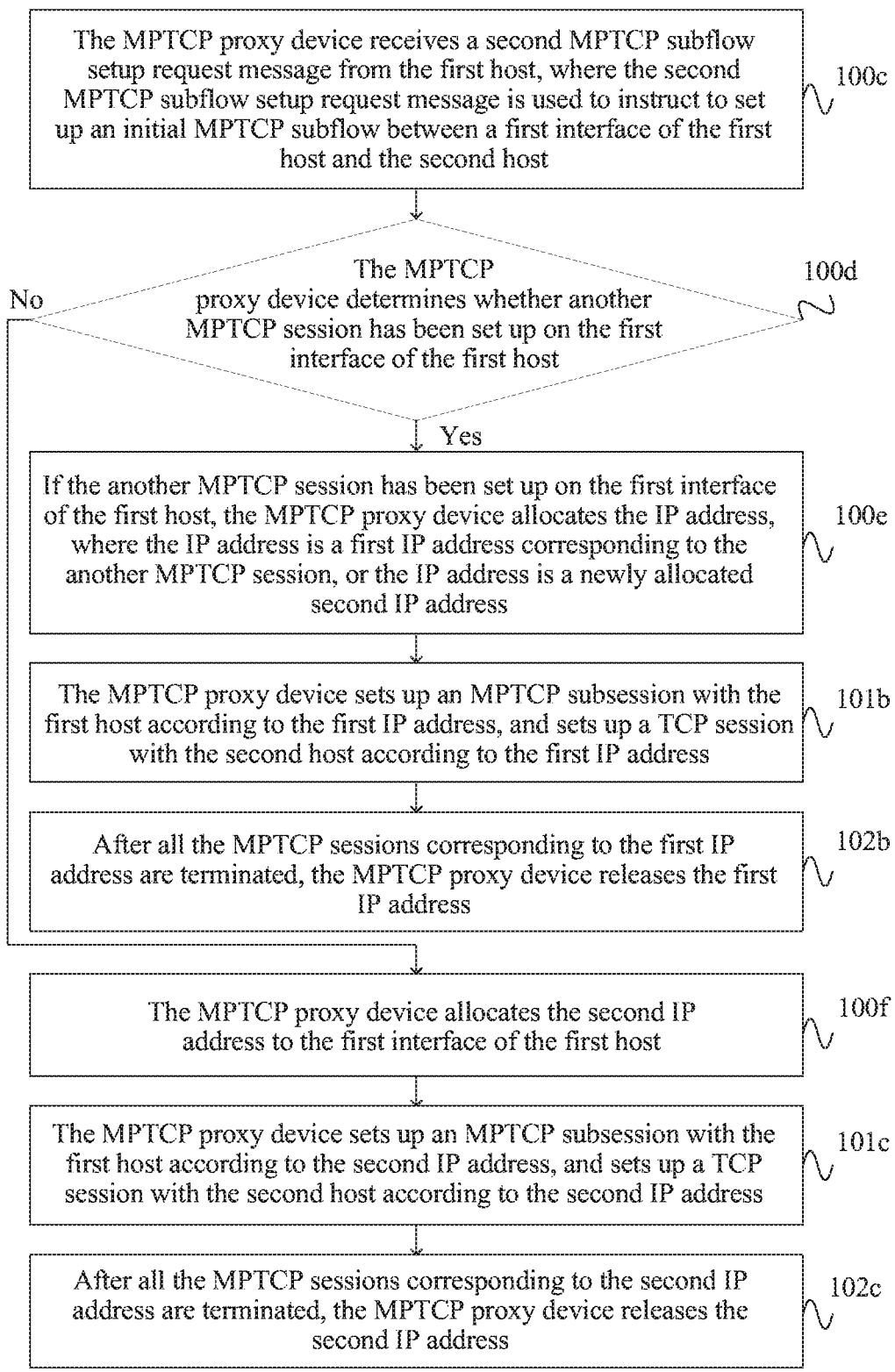
FIG. 13 is a schematic flowchart of another address management method for communication over the Multipath Transmission Control Protocol according to an embodiment of the present invention.

Specifically, on a basis of FIG. 10, FIG. 13 is a schematic flowchart of another address management method for communication over the Multipath Transmission Control Protocol according to an embodiment of the present invention. Referring to FIG. 13, in this embodiment, a possible implementation manner of step 100 in FIG. 10 is.

Step 100c: The MPTCP proxy device receives a second MPTCP subflow setup request message from the first host, where the second MPTCP subflow setup request message is used to instruct to set up an initial MPTCP subflow between a first interface of the first host and the second host.

Step 100d: The MPTCP proxy device determines whether another MPTCP session has been set up on the first interface of the first host.

Specifically, if the first interface of the first host corresponds to the MPTCP session that has been set up, step 100e is performed; otherwise, step roof is performed.

Step 100e: If the another MPTCP session has been set up on the first interface of the first host, the MPTCP proxy device allocates the IP address, where the IP address is a first IP address corresponding to the another MPTCP session, or the IP address is a newly allocated second IP address.

Specifically, after step 100e is performed, step 101b is performed.

Step 100f: The MPTCP proxy device allocates the second IP address to the first interface of the first host.

Specifically, when the MPTCP proxy device allocates the second IP address to the first interface of the first host, there are two possibilities: 1. When the first interface of the first host corresponds to the MPTCP session that has been set up, the MPTCP proxy device may still allocate the second IP address to the first interface of the first host. 2. When the first interface of the first host does not correspond to the MPTCP session that has been set up, the MPTCP proxy device allocates the second IP address to the first interface of the first host. After step roof is performed, step low is performed.

On a basis of steps 100c, 100d, 100e, and 100f, referring to FIG. 13, a possible implementation manner of step 101 in FIG. 10 is.

Step 101b: The MPTCP proxy device sets up an MPTCP subsession with the first host according to the first IP address, and sets up a TCP session with the second host according to the first IP address.

Specifically, when the IP address in step 100e is the newly allocated second IP address, the MPTCP proxy device sets up an MPTCP subsession with the first host according to the second IP address, and sets up a TCP session with the second host according to the second IP address.

Step 100c: The MPTCP proxy device sets up an MPTCP subsession with the first host according to the second IP address, and sets up a TCP session with the second host according to the second IP address.

Optionally, on a basis of the IP address allocation method using a network interface (Interface) of a host as a granularity, referring to FIG. 13, a possible implementation manner of step 102 in FIG. 10 is.

Step 102b: After all the MPTCP sessions corresponding to the first IP address are terminated, the MPTCP proxy device releases the first IP address.

It should be noted that, if the second IP address is used in step 101b, step 102b is: after all the MPTCP sessions corresponding to the second IP address are terminated, the MPTCP proxy device releases the second IP address.

Step 102c: After all the MPTCP sessions corresponding to the second IP address are terminated, the MPTCP proxy device releases the second IP address.

Figure 14:
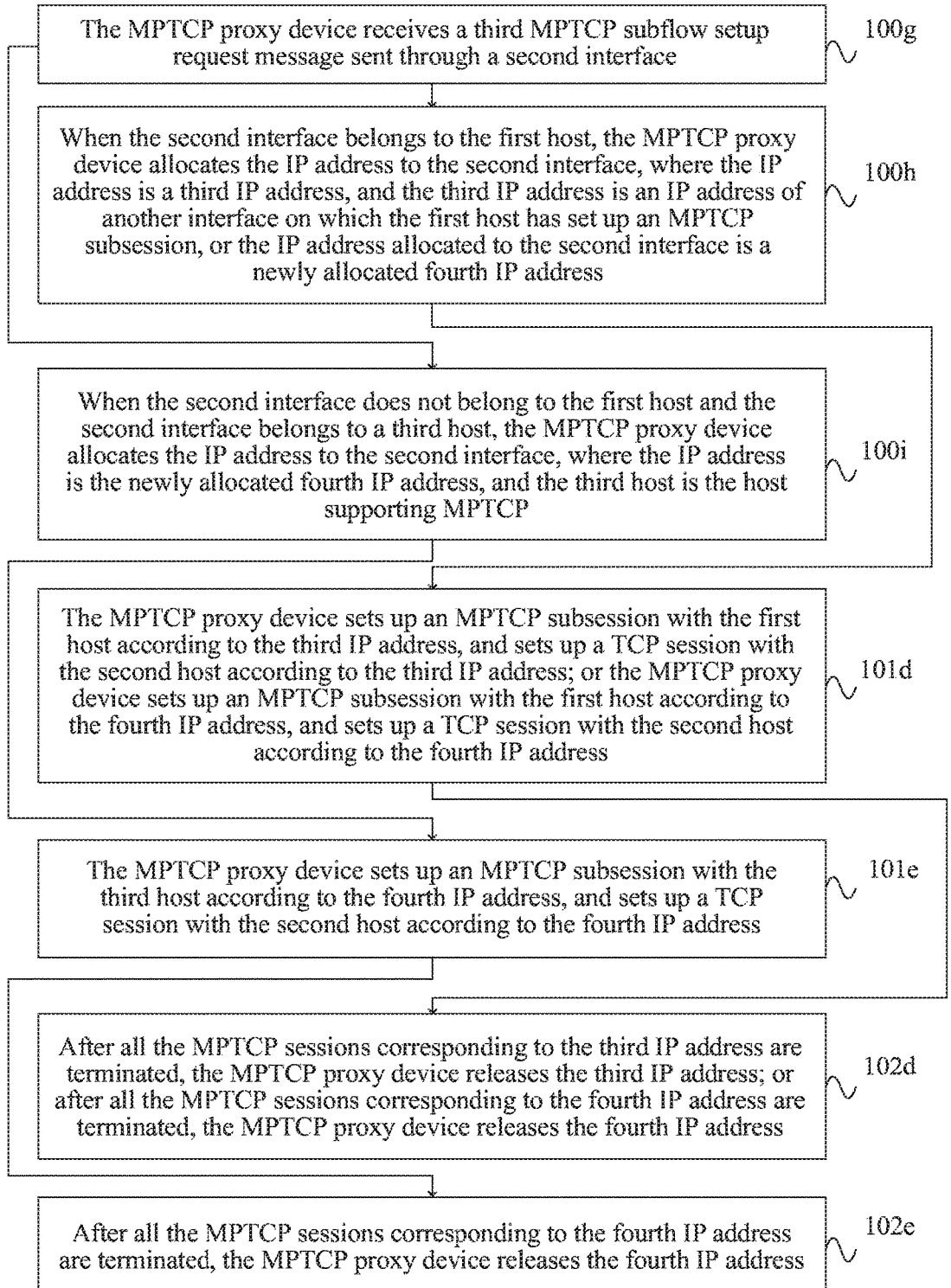
FIG. 14 is a schematic flowchart of another address management method for communication over the Multipath Transmission Control Protocol according to an embodiment of the present invention.

Specifically, on a basis of FIG. 10, FIG. 14 is a schematic flowchart of another address management method for communication over the Multipath Transmission Control Protocol according to an embodiment of the present invention. Referring to FIG. 14, in this embodiment, another possible implementation manner of step 100 in FIG. 10 is.

Step 100g: The MPTCP proxy device receives a third MPTCP subflow setup request message sent through a second interface.

The third MPTCP subflow setup request message is used to instruct to set up an initial MPTCP subflow between the second interface and the second host.

Step 100h: When the second interface belongs to the first host, the MPTCP proxy device allocates the IP address to the second interface, where the IP address is a third IP address, and the third IP address is an IP address of another interface on which the first host has set up an MPTCP subsession, or the IP address allocated to the second interface is a newly allocated fourth IP address.

Specifically, if the second interface and the another interface on which the MPTCP session has been set up both belong to the first host, the MPTCP proxy device may allocate, to the second interface, the third IP address previously allocated to the another interface, or the MPTCP proxy device allocates a new IP address to the second interface. If the second interface and the another interface on which the MPTCP session has been set up both belong to the first host, step 100h is performed; otherwise, step 100i is performed.

Step 100i: When the second interface does not belong to the first host and the second interface belongs to a third host, the MPTCP proxy device allocates the IP address to the second interface, where the IP address is the newly allocated fourth IP address, and the third host is the host supporting MPTCP.

It should be noted that, when the MPTCP proxy device determines that the second interface and the another interface on which the MPTCP session has been set up do not belong to the first host, the MPTCP proxy device can learn that the second interface belongs to another host, for example, the third host. Therefore, no additional step or function is required for determining the host to which the second interface belongs. After step 100i is performed, step 101e is performed.

On a basis of steps 100f, 100g, 100h, and 100i, referring to FIG. 14, a possible implementation manner of step 101 in FIG. 10 is.

Step 101d: The MPTCP proxy device sets up an MPTCP subsession with the first host according to the third IP address, and sets up a TCP session with the second host according to the third IP address; or the MPTCP proxy device sets up an MPTCP subsession with the first host according to the fourth IP address, and sets up a TCP session with the second host according to the fourth IP address.

Specifically, step 102d is performed after step 101d is performed.

Step 101e: The MPTCP proxy device sets up an MPTCP subsession with the third host according to the fourth IP address, and sets up a TCP session with the second host according to the fourth IP address.

Specifically, step 102e is performed after step lobe is performed.

Further, on a basis of the IP address allocation method using a network interface (Interface) of a host as a granularity, referring to FIG. 14, another two feasible implementation manners of step 102 in FIG. 10 are:

Step 102d: After all the MPTCP sessions corresponding to the third IP address are terminated, the MPTCP proxy device releases the third IP address; or after all the MPTCP sessions corresponding to the fourth IP address are terminated, the MPTCP proxy device releases the fourth IP address.

Step 102e: After all the MPTCP sessions corresponding to the fourth IP address are terminated, the MPTCP proxy device releases the fourth IP address.

Figure 15:
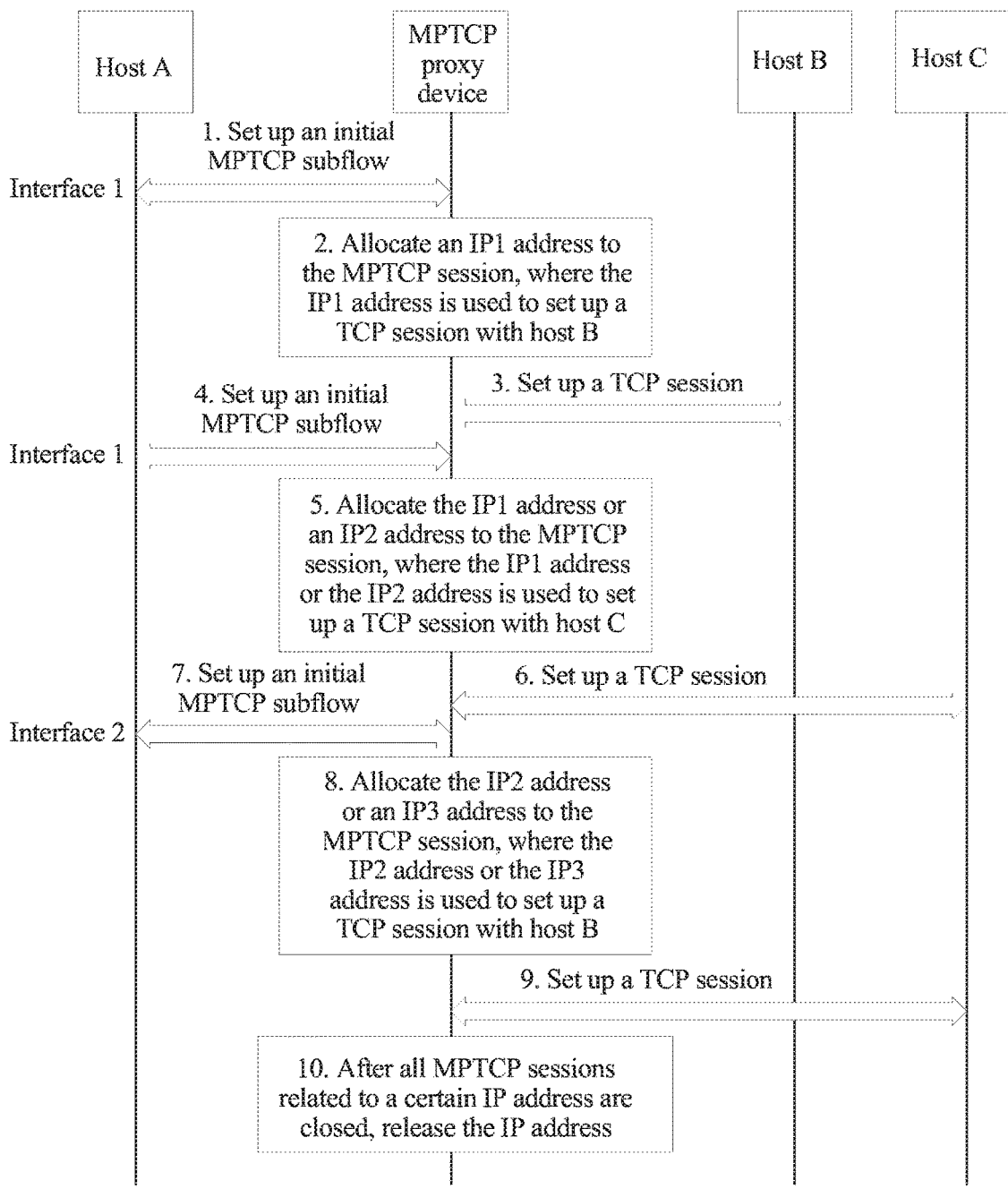
FIG. 15 is a schematic interaction diagram of another address management method for communication over the Multipath Transmission Control Protocol according to an embodiment of the present invention.

FIG. 15 is a schematic interaction diagram of another address management method for communication over the Multipath Transmission Control Protocol according to an embodiment of the present invention. Referring to FIG. 15, the interaction procedure includes the following steps.

Step 1: Host A sets up an initial MPTCP subflow with an MPTCP proxy device.

Specifically, the initial MPTCP subflow is transmitted through an interface 1 of host A, and its purpose is to set up an MPTCP session with host B.

Step 2: The MPTCP proxy device allocates an IP1 address to the MPTCP session, where the IP1 address is used to set up a TCP session with host B.

Step 3: The MPTCP proxy device sets up a TCP session with host B.

Step 4: Host A sets up an initial MPTCP subflow with the MPTCP proxy device.

Specifically, the initial MPTCP subflow is transmitted through the interface 1 of host A, and its purpose is to set up an MPTCP session with host C.

Step 5: The MPTCP proxy device allocates the IP1 address or an IP2 address to an MPTCP session, where the IP1 address or the IP2 address is used to set up a TCP session with host C.

Step 6: The MPTCP proxy device sets up a TCP session with host C.

Step 7: Host A sets up an initial MPTCP subflow with the MPTCP proxy device.

Specifically, the initial MPTCP subflow is transmitted through an interface 2 of host A, and its purpose is to set up an MPTCP session with host C.

Step 8: The MPTCP proxy device allocates the IP2 address or an IP3 address to the MPTCP session, where the IP2 address or the IP3 address is used to set up a TCP session with host C.

Step 9: The MPTCP proxy device sets up a TCP session with host C.

Specifically, host A supporting MPTCP initiates a process of setting up an initial MPTCP subflow. The process is consistent with the process shown in FIG. 4. In this case, the MPTCP proxy device may detect that host A wants to set up an MPTCP session with another host B not supporting MPTCP. Therefore, the MPTCP proxy device needs to provide a proxy function for the session, that is, in place of host B, set up an MPTCP session with host A, and in place of host A, set up a TCP session with host B. When allocating an IP address to the MPTCP session, the MPTCP proxy device performs allocation by using a network interface as a granularity. When the MPTCP proxy device receives an MPTCP session setup request from an interface of a host supporting MPTCP (for example, the interface 1 of host A), the MPTCP proxy device allocates an IP address to the MPTCP session, and uses the IP address to set up a TCP session with a host not supporting MPTCP. For different MPTCP sessions initiated by a same interface, the MPTCP proxy device may allocate a same IP address to the MPTCP sessions (for example, for the interface 1, the IP1 address may be allocated to MPTCP sessions with host B and host C), or allocate different IP addresses (for example, for the interface 1, the IP1 address is allocated to an MPTCP session with host B, and the IP2 address is allocated to an MPTCP session with host C). However, for MPTCP sessions initiated by different interfaces, the MPTCP proxy device needs to determine whether the interface and a previous interface belong to a same host. For MPTCP sessions initiated by different interfaces that belong to a same host, the MPTCP proxy device may allocate a same IP address or different IP addresses to the MPTCP sessions (for example, the interface 2 and the interface 1 belong to host A, and therefore, the same IP2 address may be allocated, or the IP2 address and the IP3 address that are different may be allocated). For MPTCP sessions initiated by different interfaces that do not belong to a same host, the MPTCP proxy device needs to allocate different IP addresses to the MPTCP sessions.

Further, a method for the MPTCP proxy device to determine whether two interfaces belong to a same host is: if two interfaces simultaneously set up subflows in a MPTCP session, it is considered that the two interfaces belong to a same host; otherwise, it cannot be determined that the two interfaces belong to a same host.

Step 10: After all MPTCP sessions related to a IP address are terminated, the MPTCP proxy device release the IP address.

Specifically, termination of an MPTCP session is a trigger condition for releasing an IP address. Two manners may be used for determining termination of an MPTCP session. The first manner is: after all MPTCP subflows included in an MPTCP session are terminated, determining termination of the MPTCP session. The second manner is: after a TCP session between the MPTCP proxy device and a host not supporting MPTCP is terminated, determining termination of an MPTCP session. After the MPTCP proxy device detects that an MPTCP session is terminated, the MPTCP proxy device may release an IP address allocated to the MPTCP session.

It should be noted that, steps 1 to 3, steps 4 to 6, and steps 7 to 9 in FIG. 15 are not subject to a logical sequence relationship, and may exist independently as three separate interaction procedures. In the address management methods for communication over the Multipath Transmission Control Protocol and corresponding possible implementation manners provided in the foregoing FIG. 10 to FIG. 15 and the corresponding embodiments, the MPTCP proxy device needs to maintain an address pool.

This embodiment provides an IP address management method in which an MPTCP proxy device does not need to maintain an address pool but allocates a new IP address to an MPTCP session. In this embodiment, an IP management device (IP address Manager) is introduced, and the IP management device is responsible for maintaining an IP address of a device accessing a network.

Figure 16:
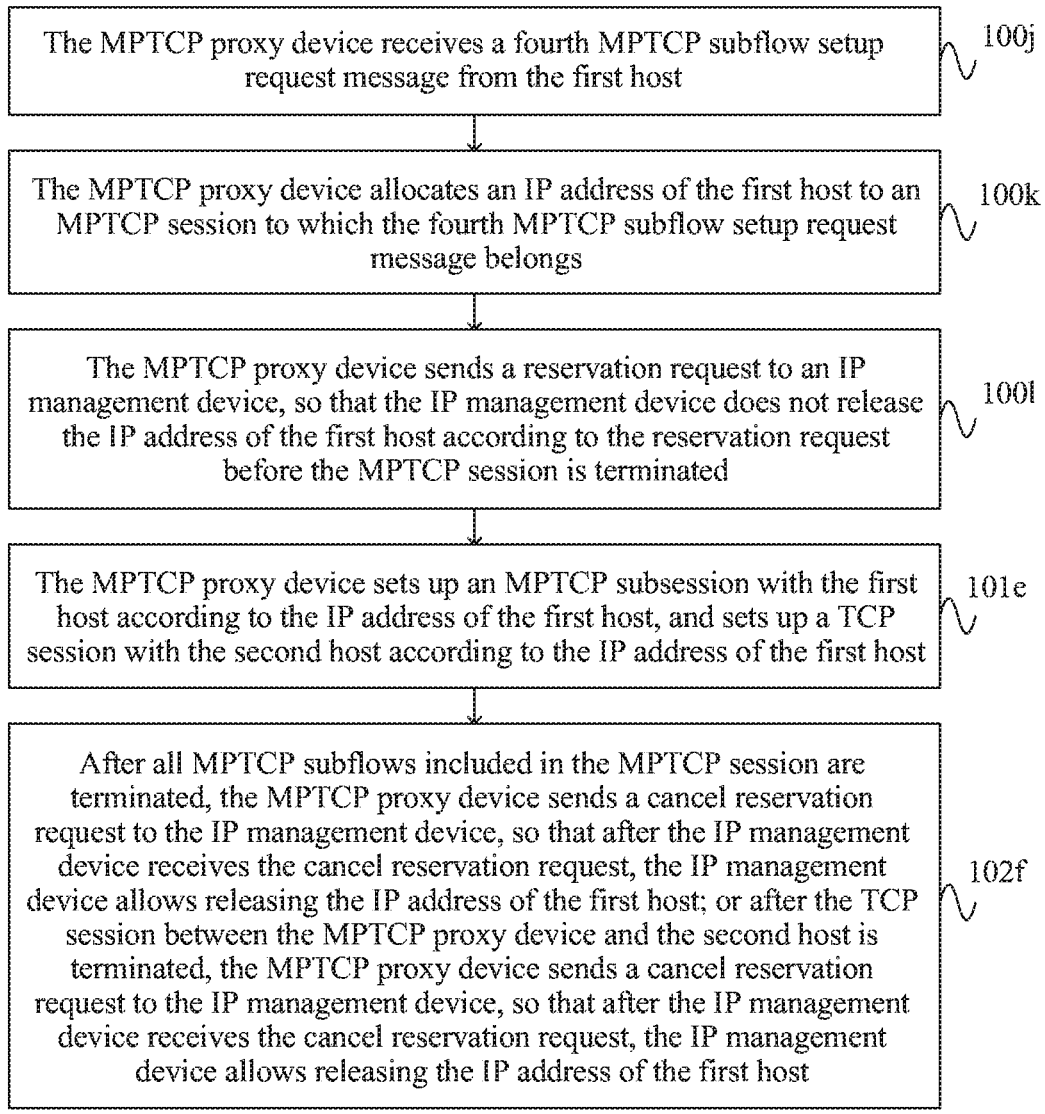
FIG. 16 is a schematic flowchart of another address management method for communication over the Multipath Transmission Control Protocol according to an embodiment of the present invention.

Specifically, on a basis of FIG. 10, FIG. 16 is a schematic flowchart of another address management method for communication over the Multipath Transmission Control Protocol according to an embodiment of the present invention. Referring to FIG. 16, in this embodiment, a possible implementation manner of step 100 in FIG. 10 is.

Step 100j: The MPTCP proxy device receives a fourth MPTCP subflow setup request message from the first host.

The fourth MPTCP subflow setup request message is used to instruct to set up an initial MPTCP subflow between the first host and the second host, and the fourth MPTCP subflow setup request message includes an IP address of the first host.

Step 100k: The MPTCP proxy device allocates an IP address of the first host to an MPTCP session to which the fourth MPTCP subflow setup request message belongs.

Step 100l: The MPTCP proxy device sends a reservation request to an IP management device, so that the IP management device does not release the IP address of the first host according to the reservation request before the MPTCP session is terminated.

On a basis of steps 100*j*, 100*k*, and 100*l*, referring to FIG. 16, a possible implementation manner of step 101 in FIG. 14 is.

Step 101*e*: The MPTCP proxy device sets up an MPTCP subsession with the first host according to the IP address of the first host, and sets up a TCP session with the second host according to the IP address of the first host.

Further, on a basis of the IP address management method in which the MPTCP proxy device does not need to maintain an address pool but allocates a new IP address to an MPTCP session, referring to FIG. 16, two feasible implementation manners of step 102 in FIG. 10 are.

Step 102*f*: After all MPTCP subflows included in the MPTCP session are terminated, the MPTCP proxy device sends a cancel reservation request to the IP management device, so that after the IP management device receives the cancel reservation request, the IP management device allows releasing the IP address of the first host; or after the TCP session between the MPTCP proxy device and the second host is terminated, the MPTCP proxy device sends a cancel reservation request to the IP management device, so that after the IP management device receives the cancel reservation request, the IP management device allows releasing the IP address of the first host.

Figure 17:
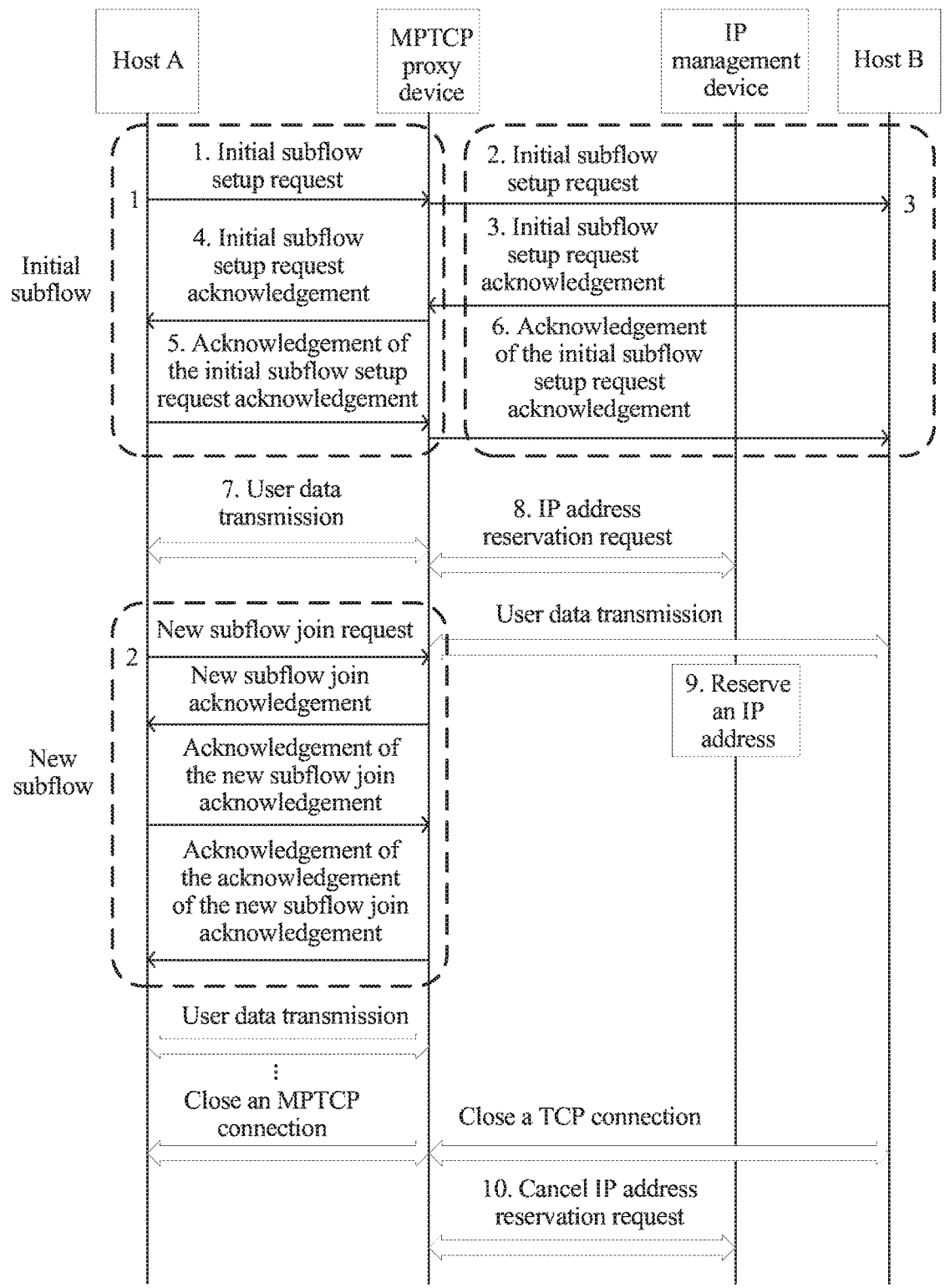
FIG. 17 is a schematic interaction diagram of another address management method for communication over the Multipath Transmission Control Protocol according to an embodiment of the present invention.

FIG. 17 is a schematic interaction diagram of another address management method for communication over the Multipath Transmission Control Protocol according to an embodiment of the present invention. Referring to FIG. 17, the interaction procedure includes the following steps.

Step 1: Host A sends an initial subflow setup request [SYN+MP_CAPABLE(src=IP-A1)] to an MPTCP proxy device.

Step 2: The MPTCP proxy device sends an initial subflow setup request [SYN+MP_CAPABLE(src=IP-A1)] to host B.

It should be noted that, host B supports only TCP.

Step 3: Host B sends an initial subflow setup request acknowledgement (SYN+ACK) to the MPTCP proxy device.

Step 4: The MPTCP proxy device sends an initial subflow setup request acknowledgement (SYN/ACK+MP_CAPABLE) to host A.

Step 5: Host A sends an acknowledgement (ACK+MP_CAPABLE) of the initial subflow setup request acknowledgement to the MPTCP proxy device.

Step 6: The MPTCP proxy device sends an acknowledgement (ACK) of the initial subflow setup request acknowledgement to host B.

Specifically, host A supporting MPTCP initiates a process of setting up an initial MPTCP subflow. The process is consistent with the process shown in FIG. 4. In this case, the MPTCP proxy device may detect that host A wants to set up an MPTCP session with another host B not supporting MPTCP. Therefore, the MPTCP proxy device needs to provide a proxy function for the session, that is, in place of host B, set up an MPTCP session with host A, and in place of host A, set up a TCP session with host B. The MPTCP proxy device uses an IP address of host A, carried in the initial subflow from host A, to set up the TCP session with host B.

Step 7: Host A performs user data transmission with the MPTCP proxy device.

Step 8: The MPTCP proxy device sends an IP address (an IP address requested to be reserved is IP-A1) reservation request [IP addr reservation(IP-A1)] to an IP management device.

Specifically, after the MPTCP proxy device uses the IP address of host A in the initial subflow to set up the TCP session with host B, the MPTCP proxy device initiates an IP address reservation request to the IP management device (IP address Manager) maintaining the IP address of the host. After the IP management device receives the request, it is ensured that the IP address is not released or allocated to another host before a cancel IP address reservation request message is received.

It should be noted that, joining of a new subflow in this embodiment is similar to a new subflow join procedure in FIG. 4, and is not described again herein.

Step 9: Reserve the IP (IP-A1) address [reserve IP address].

Specifically, before receiving a cancel IP address (IP-A1) reservation request sent by the MPTCP proxy device, the IP management device reserves the IP address, and performs user data transmission.

Step 10: The IP management device receives a cancel IP address (IP-A1) reservation request [cancel IP addr reservation(IP-A1)] sent by the MPTCP proxy device.

Specifically, termination of an MPTCP session is a trigger condition for releasing an IP address. Two manners may be used for determining termination of an MPTCP session. The first manner is: after all MPTCP subflows included in an MPTCP session are terminated, determining termination of the MPTCP session (that is, an MPTCP connection is closed). The second manner is: after a TCP session between the MPTCP proxy device and a host not supporting MPTCP (for example, host B) is terminated, determining termination of an MPTCP session (a TCP connection is closed). After the MPTCP proxy device detects that an MPTCP session is terminated, the MPTCP proxy device may initiate a cancel IP address reservation request message to the IP management device. After receiving the cancel IP address reservation request message, the IP management device may allow the IP address to be released or allocated to another host.

Further, a feasible implementation manner for reserving the IP address is: an occasion for initiating the cancel IP address reservation request (cancel IP addr reservation) is: after the MPTCP proxy device receives an initial subflow termination message from the host supporting MPTCP; or an occasion for initiating the cancel IP address reservation request (cancel IP addr reservation) is: after all MPTCP subflows of the host supporting MPTCP are terminated, the MPTCP proxy device sends the message.

An action after the IP management device receives the IP address reservation request message is: after receiving the IP address reservation request message, the IP management device does not allocate the IP address specified in the message to another host, until a cancel IP address reservation request message is received.

In this case, even if an interface corresponding to the initial subflow of the host supporting MPTCP does not initiate an extend IP address lifetime (extend IP address lifetime) message to the IP management device, the IP management device may also reserve the IP address. If the interface requests the IP address again afterward, the IP address is preferentially allocated to the interface again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present embodiments, but not for limiting the present embodiments. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present embodiments shall be subject to the protection scope of the claims.

What is claimed is:

1. An apparatus, comprising:
a processor; and
a non-transitory computer readable storage medium storing a program for execution by the processor, the program including instructions to:
allocate a first internet protocol (IP) address to a first Multipath Transmission Control Protocol (MPTCP) session, wherein the first MPTCP session is an MPTCP session between a first host and a second host, and wherein the first host is supporting MPTCP and the second host is not supporting MPTCP;
release the first IP address allocated to the first MPTCP session in response to the first MPTCP session being terminated;
set up the first MPTCP session according to the first IP address;
receive a first MPTCP subflow setup request message from a source, wherein the first MPTCP subflow setup request instructs the apparatus to set up an initial MPTCP subflow between the source and the second host; and
perform at least one of:
determine whether another MPTCP session has been set up on the source;
allocate the first IP address, wherein the first IP address corresponds to the another MPTCP session, or the first IP address is a newly allocated IP address, in response to the another MPTCP session being set up on the source;
set up an MPTCP subsession with the first host according to the first IP address; and
set up a TCP session with the second host according to the first IP address; or
allocate the first IP address to the source in response to the source belonging to the first host, and the first IP address being an IP address of another interface on which the first host has set up an MPTCP subsession, or the first IP address allocated to a second interface being a newly allocated IP address;
allocate a second IP address to the source in response to the source not belonging to the first host and the second interface belonging to a third host, wherein the second IP address is the newly allocated IP address, and wherein the third host supports MPTCP; and
set up an MPTCP subsession with the first host according to the IP address of the another interface, and set up a TCP session with the second host according to the IP address of the another interface, set up an MPTCP subsession with the first host according to the newly allocated IP address, and set up a TCP session with the second host according to the newly allocated IP address, or set up an MPTCP subsession with the third host according to the newly allocated IP address, and set up a TCP session with the second host according to the newly allocated IP address; or
send a reservation request to an IP management device requesting that the IP management device not release an IP address of the first host, according to the reservation request, before the first MPTCP session is terminated, wherein the first MPTCP subflow setup request message comprises the IP address of the first host;
allocate the IP address of the host to an MPTCP session to which the first MPTCP subflow setup request message belongs;
set up an MPTCP subsession with the first host according to the IP address of the first host; and
set up a TCP session with the second host according to the IP address of the first host.

2. The apparatus according to claim 1, wherein the instructions further comprise instructions to release the first IP address after the TCP session with the first host not supporting the first MPTCP is terminated or all MPTCP subflows in the MPTCP session are terminated.

3. The apparatus according to claim 1, wherein the source is the first host, and wherein the first MPTCP subflow setup request instructs the apparatus to set up an initial MPTCP subflow between a first interface of the first host and the second host.

4. The apparatus according to claim 3, wherein the instructions further comprise instructions to release the first IP address after all MPTCP sessions corresponding to the first IP address are terminated.

5. The apparatus according to claim 1, wherein the source is the second interface, and wherein the first MPTCP subflow setup request message instructs the apparatus to set up an initial MPTCP subflow between the second interface and the second host.

6. The apparatus according to claim 5, wherein the instructions further comprise instructions to:
after all MPTCP sessions corresponding to the second IP address are terminated, release the second IP address.

7. The apparatus according to claim 1, wherein the source is the first host, and wherein the first MPTCP subflow setup request message instructs the apparatus to set up an initial MPTCP subflow between the first host and the second host.

8. The apparatus according to claim 7, wherein the instructions further comprise instructions to send a cancel reservation request to the IP management device, requesting that the IP management device allow releasing the IP address of the first host, after all MPTCP subflows in the first MPTCP session are terminated or after the TCP session with the second host is terminated.

9. A method comprising:
allocating, by an Multipath Transmission Control Protocol (MPTCP) proxy device, a first IP address to a first MPTCP session, wherein the first MPTCP session is between a first host and a second host, wherein the first host is supporting MPTCP, and the second host is not supporting MPTCP;
setting up, by the MPTCP proxy device, the first MPTCP session according to the first IP address;
releasing, by the MPTCP proxy device, the first IP address allocated to the first MPTCP session in response to the first MPTCP session being terminated;

receiving a first MPTCP subflow setup request message from a source, wherein the first MPTCP subflow setup request instructs the MPTCP proxy device to set up an initial MPTCP subflow between the source and the second host; and performing at least one of:
  determining whether another MPTCP session has been set up on the source;
  allocating the first IP address, wherein the first IP address corresponds to the another MPTCP session, or the first IP address is a newly allocated IP address, in response to the another MPTCP session being set up on the source;
  setting up an MPTCP subsession with the first host according to the first IP address; and
  setting up a TCP session with the second host according to the first IP address; or
  allocating the first IP address to the source in response to the source belonging to the first host, and the first IP address being an IP address of another interface on which the first host has set up an MPTCP subsession, or the first IP address allocated to a second interface being a newly allocated IP address;
  allocating a second IP address to the source in response to the source not belonging to the first host and the second interface belonging to a third host, wherein the second IP address is the newly allocated IP address, and wherein the third host supports MPTCP; and
  setting up an MPTCP subsession with the first host according to the IP address of the another interface, and setting up a TCP session with the second host according to the IP address of the another interface, setting up an MPTCP subsession with the first host according to the newly allocated IP address, and setting up a TCP session with the second host according to the newly allocated IP address, or setting up an MPTCP subsession with the third host according to the newly allocated IP address, and setting up a TCP session with the second host according to the newly allocated IP address; or
  sending a reservation request to an IP management device requesting that the IP management device not release an IP address of the first host, according to the reservation request, before the first MPTCP session is terminated, wherein the first MPTCP subflow setup request message comprises the IP address of the first host;
  allocating the IP address of the first host to an MPTCP session to which the first MPTCP subflow setup request message belongs;
  setting up an MPTCP subsession with the first host according to the IP address of the first host; and
  setting up a TCP session with the second host according to the IP address of the first host.

10. The method according to claim 9, wherein releasing the first IP address allocated to the first MPTCP session comprises releasing, by the MPTCP proxy device, the first IP address, after all MPTCP subflows comprised in the first MPTCP session are terminated or after the TCP session between the MPTCP proxy device and the first host not supporting MPTCP is terminated.

11. The method according to claim 9, wherein the source is the first host, and wherein the first MPTCP subflow setup request message instructs the MPTCP proxy device to set up an initial MPTCP subflow between a first interface of the first host and the second host.

12. The method according to claim 11, wherein releasing the first IP address allocated to the first MPTCP session comprises releasing, by the MPTCP proxy device, the first IP address after all the MPTCP sessions corresponding to the first IP address are terminated.

13. The method according to claim 9, wherein the source is the second interface, and wherein the first MPTCP subflow setup request message instructs the MPTCP proxy device to set up an initial MPTCP subflow between the second interface and the second host.

14. The method according to claim 13, wherein releasing the first IP address allocated to the first MPTCP session comprises releasing, by the MPTCP proxy device, the first IP address after all the MPTCP sessions corresponding to the first IP address are terminated.

15. The method according to claim 9, wherein source is the first host, wherein the first MPTCP subflow setup request message instructs the MPTCP proxy to set up an initial MPTCP subflow between the first host and the second host.

16. The method according to claim 15, wherein releasing the first IP address allocated to the first MPTCP session comprises sending, by the MPTCP proxy device, a cancel reservation request to the IP management device, requesting that the IP management device allow releasing the first IP address of the first host, after all MPTCP subflows comprised in the first MPTCP session are terminated or after the TCP session between the MPTCP proxy device and the second host is terminated.

17. A non-transitory computer readable storage medium storing a program for execution by a processor, the program including instructions to:
  allocate a first internet protocol (IP) address to a first Multipath Transmission Control Protocol (MPTCP) session, wherein the first MPTCP session is an MPTCP session between a first host and a second host, and wherein the first host is supporting the MPTCP and the second host is not supporting MPTCP;
  release the first IP address allocated to the first MPTCP session in response to the first MPTCP session being terminated;
  set up the first MPTCP session according to the first IP address;
  receive a first MPTCP subflow setup request message from a source, wherein the first MPTCP subflow setup request instructs set up of an initial MPTCP subflow between the source and the second host; and
  perform at least one of:
    determine whether another MPTCP session has been set up on the source;
    allocate the first IP address, wherein the first IP address corresponds to the another MPTCP session, or the first IP address is a newly allocated IP address, in response to the another MPTCP session being set up on the source;
    set up an MPTCP subsession with the first host according to the first IP address; and
    set up a TCP session with the second host according to the first IP address; or
    allocate the first IP address to the source in response to the source belonging to the first host, and the first IP address being an IP address of another interface on which the first host has set up an MPTCP subsession, or the first IP address allocated to a second interface being a newly allocated IP address;
    allocate a second IP address to the source in response to the source not belonging to the first host and the second interface belonging to a third host, wherein the second IP address is the newly allocated IP address, and wherein the third host supports MPTCP; and set up an MPTCP subsession with the first host according to the IP address of the another interface, and set up a TCP session with the second host according to the IP address of the another interface, set up an MPTCP subsession with the first host according to the newly allocated IP address, and set up a TCP session with the second host according to the newly allocated IP address, or set up an MPTCP subsession with the third host according to the newly allocated IP address, and set up a TCP session with the second host according to the newly allocated IP address; or send a reservation request to an IP management device requesting that the IP management device not release an IP address of the first host, according to the reservation request, before the first MPTCP session is terminated, wherein the first MPTCP subflow setup request message comprises the IP address of the first host;

allocate the IP address of the first host to an MPTCP session to which the first MPTCP subflow setup request message belongs;

set up an MPTCP subsession with the first host according to the IP address of the first host; and set up a TCP session with the second host according to the IP address of the first host.

18. The non-transitory computer readable storage according to claim 17, wherein the source is the first host, and wherein the first MPTCP subflow setup request instructs set up of an initial MPTCP subflow between a first interface of the first host and the second host; and wherein the instructions further comprise instructions to release the first IP address after all MPTCP sessions corresponding to the first IP address are terminated.

19. The non-transitory computer readable storage medium according to claim 17, wherein the source is the second interface, and wherein the first MPTCP subflow setup request message instructs set up of an initial MPTCP subflow between the second interface and the second host; and wherein the instructions further comprise instructions to release the second IP address after all MPTCP sessions corresponding to the second IP address are terminated.

20. The non-transitory computer readable storage medium according to claim 17, wherein the source is the first host, and wherein the first MPTCP subflow setup request message instructs set up of an initial MPTCP subflow between the first host and the second host; and wherein the instructions further comprise instruction sot send a cancel reservation request to the IP management device, requesting that the IP management device allow releasing the IP address of the first host, after all MPTCP subflows in the first MPTCP session are terminated or after the TCP session with the second host is terminated.

* * * * *

UNITED STATES PATENT AND TRADEMARK OFFICE
CERTIFICATE OF CORRECTION

PATENT NO. : 10,542,053 B2
APPLICATION NO. : 15/473159
DATED : January 21, 2020
INVENTOR(S) : Xinpeng Wei Page 1 of 1

It is certified that error appears in the above-identified patent and that said Letters Patent is hereby corrected as shown below:

In the Claims

In Column 28, Line 15, Claim 1, delete "allocate the IP address of the host to an MPTCP" and insert --allocate the IP address of the first host to an MPTCP--.

In Column 32, Lines 1-2, Claim 18, delete "computer readable storage according to claim 17" and insert --computer readable storage medium according to claim 17--.

In Column 32, Lines 22-23, Claim 20, delete "instruction sot send" and insert --instructions to send--.

Signed and Sealed this
Twenty-first Day of July, 2020

Andrei Iancu
*Director of the United States Patent and Trademark Office*